(12) United States Patent
Ito et al.

(10) Patent No.: US 12,174,654 B2
(45) Date of Patent: *Dec. 24, 2024

(54) OPERATION DEVICE FOR INPROVING ACCURACY OF VALUE OF OUTPUT SIGNAL INDICATING A NEUTRAL POSITION

(71) Applicant: ALPS ALPINE CO., LTD., Tokyo (JP)

(72) Inventors: Masashi Ito, Miyagi (JP); Masatoshi Ono, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/490,154

(22) Filed: Oct. 19, 2023

(65) Prior Publication Data
US 2024/0045463 A1    Feb. 8, 2024

Related U.S. Application Data

(63) Continuation of application No. 18/059,090, filed on Nov. 28, 2022, now Pat. No. 11,829,181, which is a
(Continued)

(30) Foreign Application Priority Data

Jun. 3, 2020   (JP) ................. 2020-097186

(51) Int. Cl.
G05G 9/047   (2006.01)
G05G 5/05   (2006.01)

(52) U.S. Cl.
CPC ............... *G05G 9/047* (2013.01); *G05G 5/05* (2013.01); *G05G 2009/04725* (2013.01); *G05G 2009/04751* (2013.01)

(58) Field of Classification Search
CPC ................... G05G 9/047; G05G 5/05; G05G 2009/04751; G05G 2009/04725; H01H 3/32; A63F 13/24
See application file for complete search history.

(56) References Cited

U.S. PATENT DOCUMENTS

| 6,078,247 | A | * | 6/2000 | Shimomura | ........... | H01C 10/16 338/160 |
| 6,538,639 | B1 | * | 3/2003 | Takahashi | .............. | G05G 9/047 345/161 |

(Continued)

FOREIGN PATENT DOCUMENTS

| JP | 2002-099337 | 4/2002 |
| JP | 2002-278695 | 9/2002 |

(Continued)

OTHER PUBLICATIONS

International Search Report for PCT/JP2021/007111 mailed on Apr. 6, 2021.

*Primary Examiner* — Deeprose Subedi
(74) *Attorney, Agent, or Firm* — IPUSA, PLLC

(57) ABSTRACT

An operation device includes a lever configured to be tiltable; a substrate; a first resistor disposed on the substrate to extend in a first direction; a first actuator configured to rotate in accordance with tilting of the lever; and a first holder configured to hold a first slider and cause the first slider to slide on the first resistor by moving in the first direction via a first drive transmission part in accordance with rotation of the first actuator. The first drive transmission part includes a first protrusion integrated with the first holder and protruding in a second direction, and a first engagement portion integrated with the first actuator and including a pair of holding pieces configured to hold the first protrusion from
(Continued)

both sides in the first direction. A first holding piece of the holding pieces is more elastic than a second holding piece of the holding pieces.

5 Claims, 21 Drawing Sheets

Related U.S. Application Data continuation of application No. PCT/JP2021/007111, filed on Feb. 25, 2021.

(56) References Cited

U.S. PATENT DOCUMENTS

| | | | | |
|---|---|---|---|---|
| 10,770,247 | B1* | 9/2020 | Wu | H01H 23/04 |
| 2002/0056621 | A1* | 5/2002 | Nakai | G05G 9/047 |
| | | | | 200/61.39 |
| 2018/0190452 | A1* | 7/2018 | Wu | H01H 25/04 |

FOREIGN PATENT DOCUMENTS

| | | |
|---|---|---|
| JP | 2007-004703 | 1/2007 |
| JP | 2019-160457 | 9/2019 |

* cited by examiner

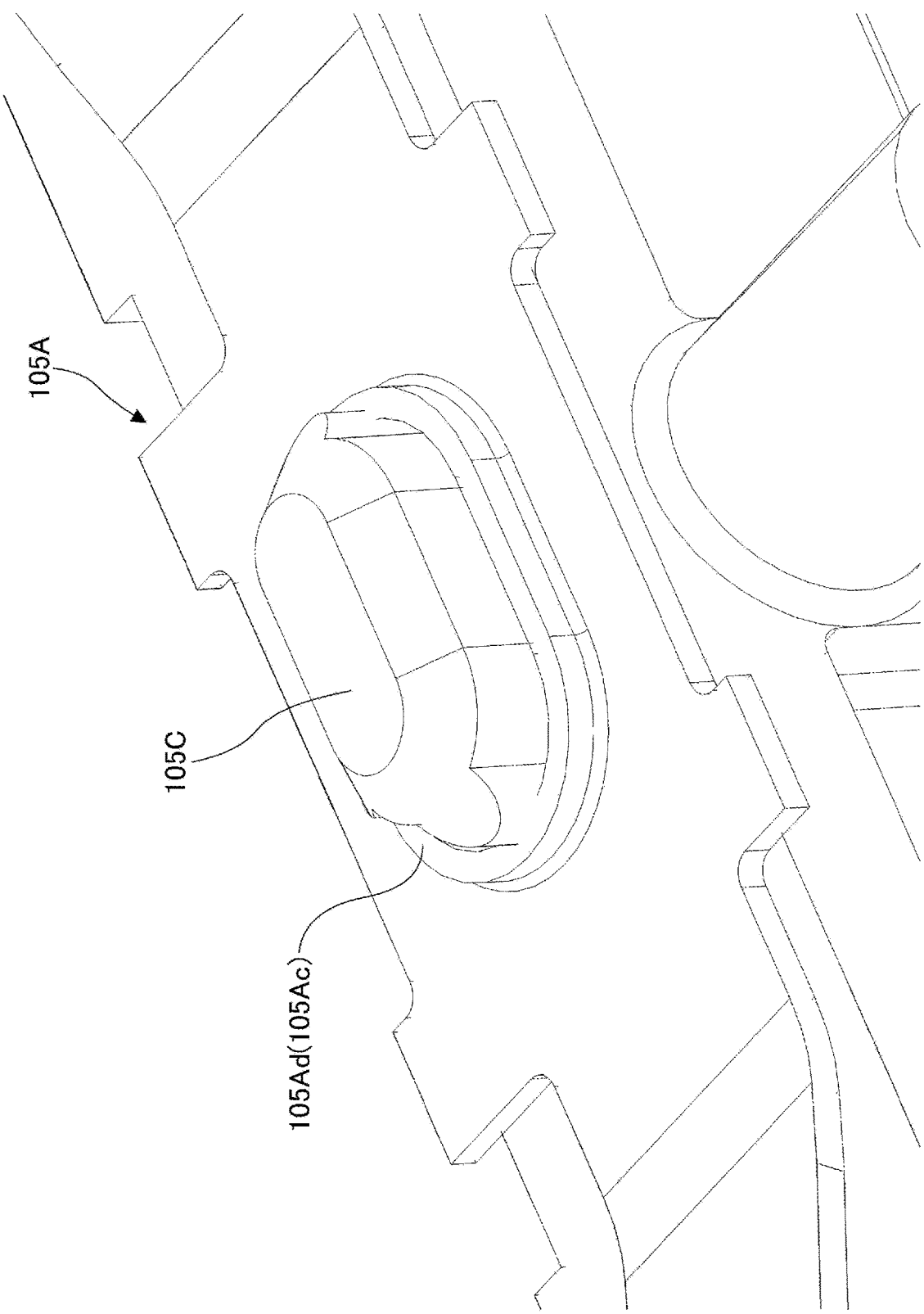

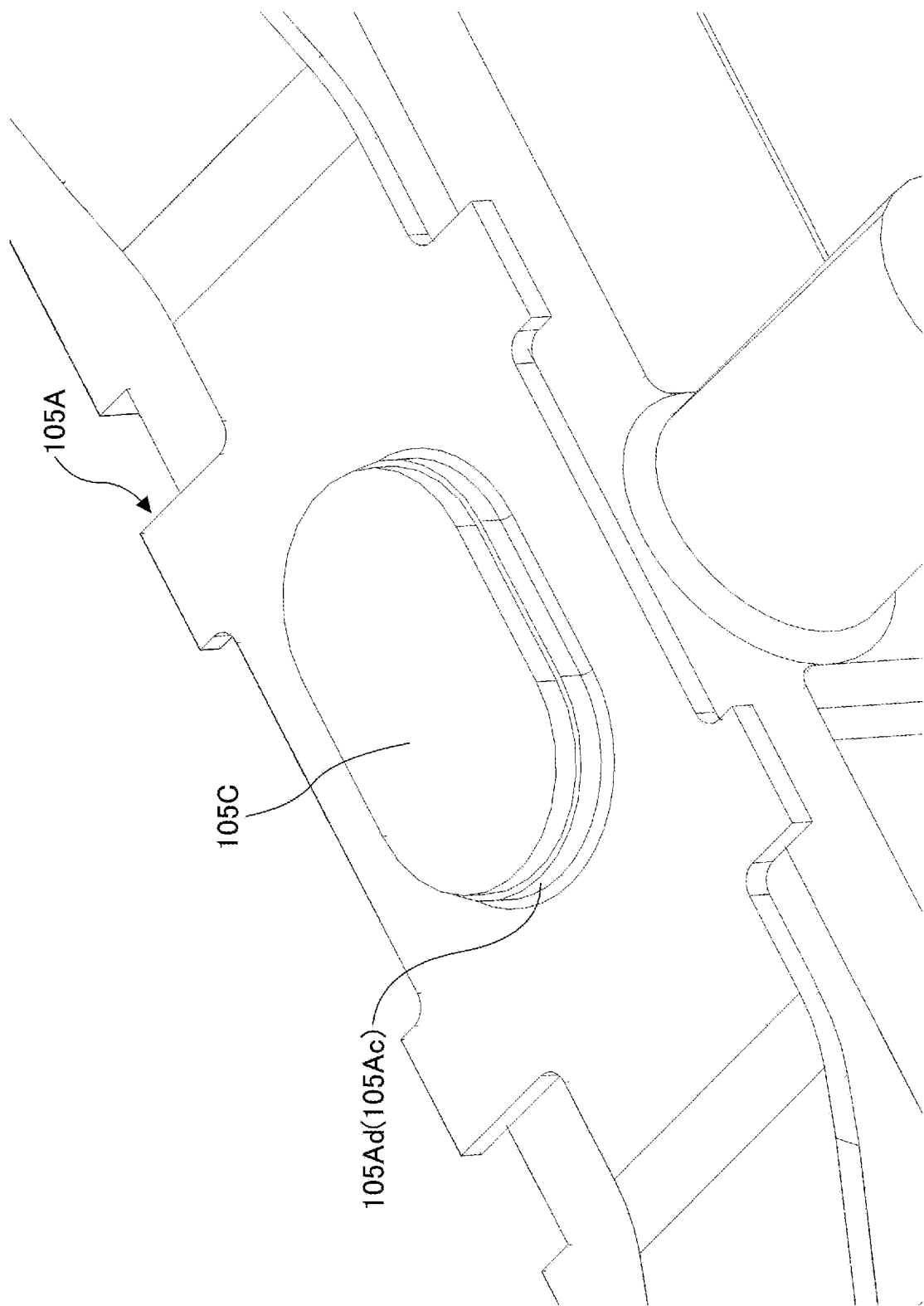

OPERATION DEVICE FOR INPROVING ACCURACY OF VALUE OF OUTPUT SIGNAL INDICATING A NEUTRAL POSITION

CROSS-REFERENCE TO RELATED APPLICATIONS

This application is a continuation of U.S. patent application Ser. No. 18/059,090, filed on Nov. 28, 2022, which is a continuation application of International Application No. PCT/JP2021/007111, filed on Feb. 25, 2021 and designating the U.S., which claims priority to Japanese Patent Application No. 2020-097186, filed on Jun. 3, 2020. The contents of these applications are incorporated herein by reference in their entirety.

BACKGROUND OF THE INVENTION

1. Field of the Invention

The disclosure herein relates to an operation device.

2. Description of the Related Art

For example, Patent Document 1 relates to a multidirectional input device and describes a technique by which a variable resistor detects rotation of a movable member that rotates in accordance with the tilting of an operation member.

In conventional input devices, a technique for detecting the tilting of a lever based on a change in a resistance value is utilized. The resistance value is changed by moving a holder in a horizontal direction via a drive transmission part in accordance with the tilting of the lever so as to cause a slider held by the holder to slide on the surface of a resistor provided on the substrate.

However, in the conventional technique, there may be cases where the holder does not return to a neutral position due to looseness of the drive transmission part even when the lever returns to the neutral position, and as a result, a value of an output signal may be unable to indicate the neutral position.

RELATED-ART DOCUMENTS

Patent Documents

Patent Document 1: Japanese Laid-open Patent Publication No. 2019-160457

SUMMARY OF THE INVENTION

According to an embodiment, an operation device includes a lever configured to be tiltable; a substrate having a surface; a first resistor having a strip shape and disposed on the surface of the substrate to extend in a first direction; a first actuator configured to rotate in accordance with tilting of the lever; and a first holder configured to hold a first slider and cause the first slider to slide on a surface of the first resistor by moving in the first direction via a first drive transmission part in accordance with rotation of the first actuator. The first drive transmission part includes a first protrusion and a first engagement portion. The first protrusion has a cylindrical shape, is integrated with the first holder, and protrudes in a second direction that is orthogonal to the first direction. The first engagement portion is integrated with the first actuator and includes a pair of holding pieces configured to hold the first protrusion from both sides in the first direction. A first holding piece of the pair of holding pieces of the first engagement portion is more elastic than a second holding piece of the pair of holding pieces.

BRIEF DESCRIPTION OF THE DRAWINGS

Other objects and further features of the present invention will be apparent from the following detailed description when read in conjunction with the accompanying drawings, in which:

FIG. 20 is an enlarged perspective view of the exterior of the a second holder and a second slider (before swaging) according to a fourth modification; and FIG. 21 is an enlarged perspective view of the exterior of the second holder and the second slider (after swaging) according to the fourth modification.

DESCRIPTION OF THE EMBODIMENTS

In the following, embodiments of the present invention will be described with reference to the accompanying drawings.

Overview of Operation Device 100

Figure 1:
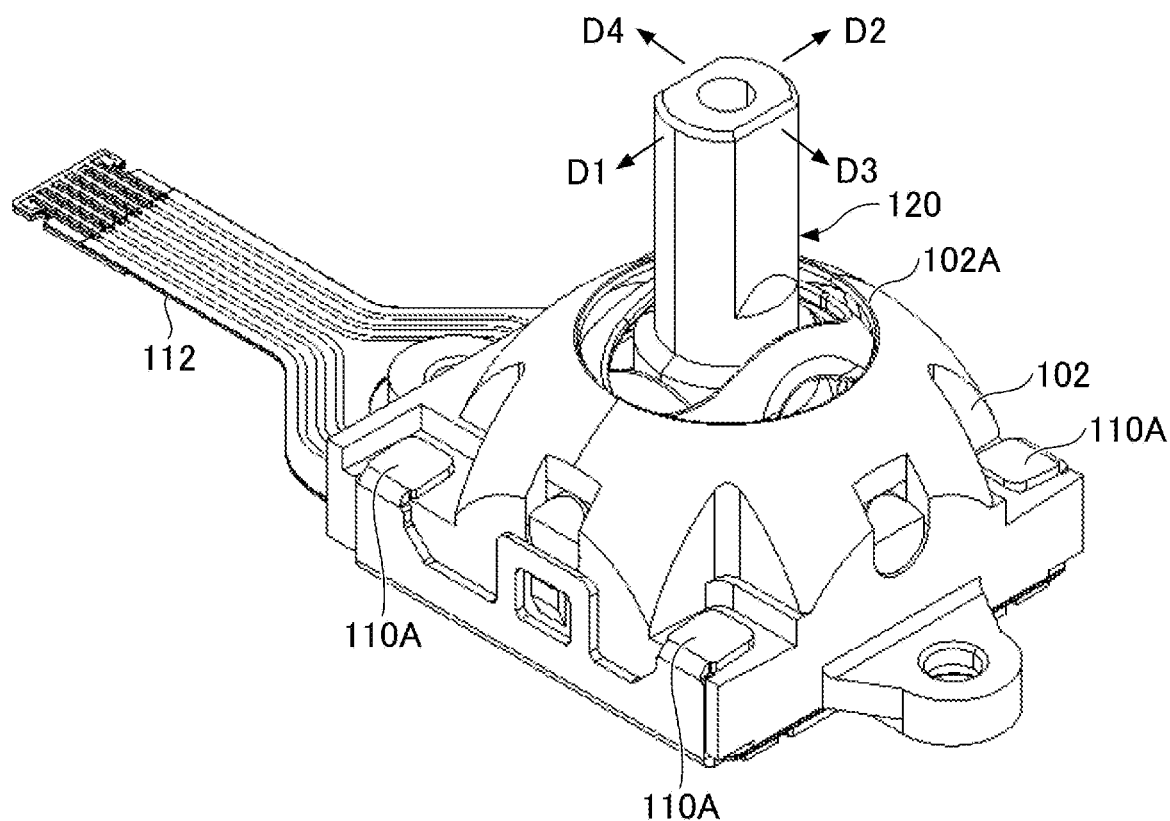
FIG. 1 is a perspective view of the exterior of an operation device according to an embodiment.

FIG. 1 is a perspective view of the exterior of an operation device 100 according to an embodiment. In the following description, a Z-axis direction in the drawings is referred to as an upper-lower direction, an X-axis direction in the drawings is referred to as a front-rear direction, and a Y-axis direction in the drawings is referred to as a left-right direction for the sake of convenience. The Y-axis direction in the drawings is an example of a "first direction", and the X-axis direction is an example of a "second direction".

The operation device 100 illustrated in FIG. 1 is used for a controller or the like of a game machine or the like. As illustrated in FIG. 1, the operation device 100 includes a lever 120 having a cylindrical shape. The lever 120 is configured to be tiltable and extends upward through an opening 102A of a case 102. In the operation device 100, the lever 120 can be tilted not only in the front-rear direction (indicated by arrows D1 and D2 in the drawings) and the left-right direction (indicated by arrows D3 and D4 in the drawing), but also in any direction other than the above directions. Further, the operation device 100 can output an operation signal corresponding to the tilting (tilt direction and tilt angle) of the lever 120 to the outside via a flexible printed circuit (FPC) 112.

(Configuration of Operation Device 100)

Figure 2:
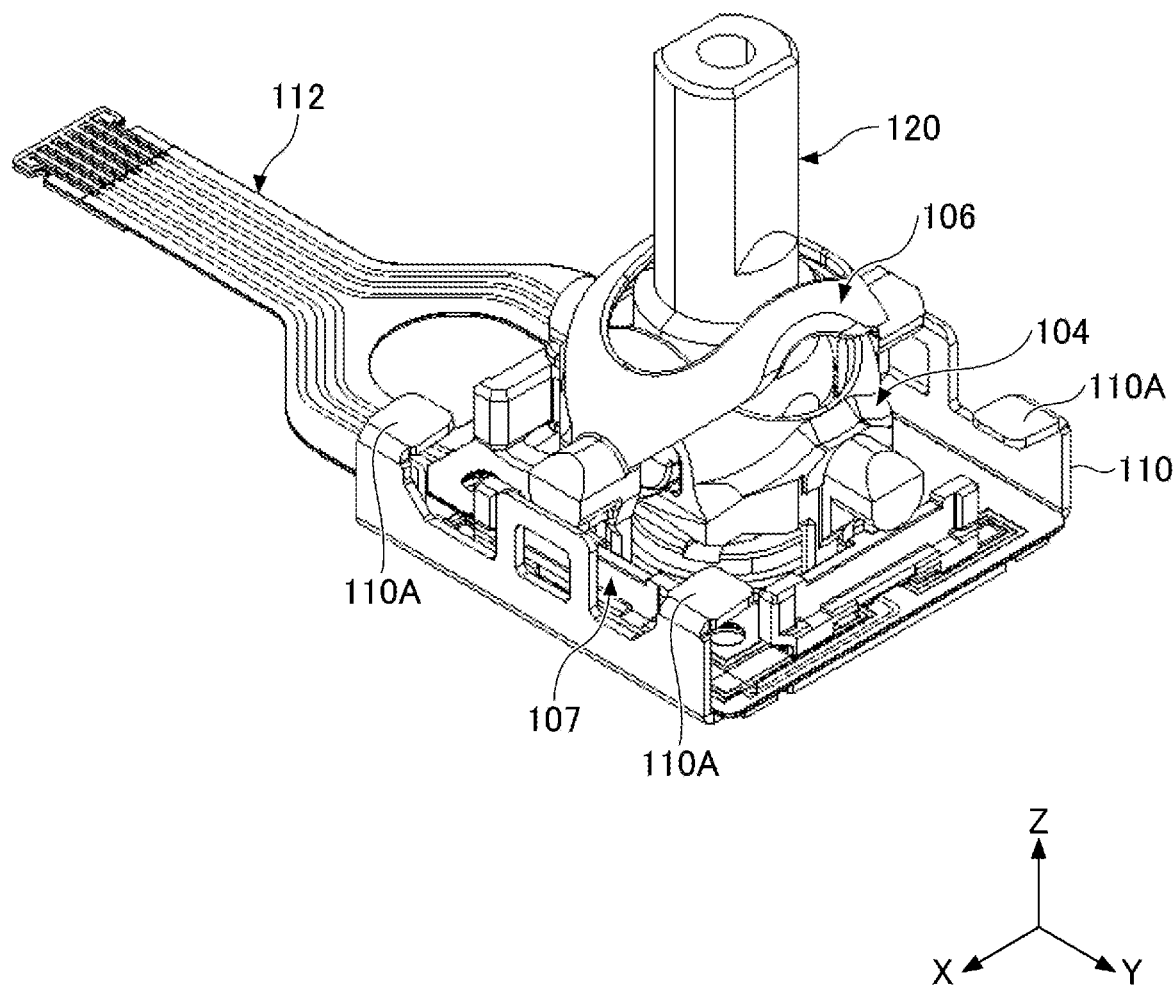
FIG. 2 is a perspective view of the exterior of the operation device (from which a case is removed) according to the embodiment.
Figure 3:
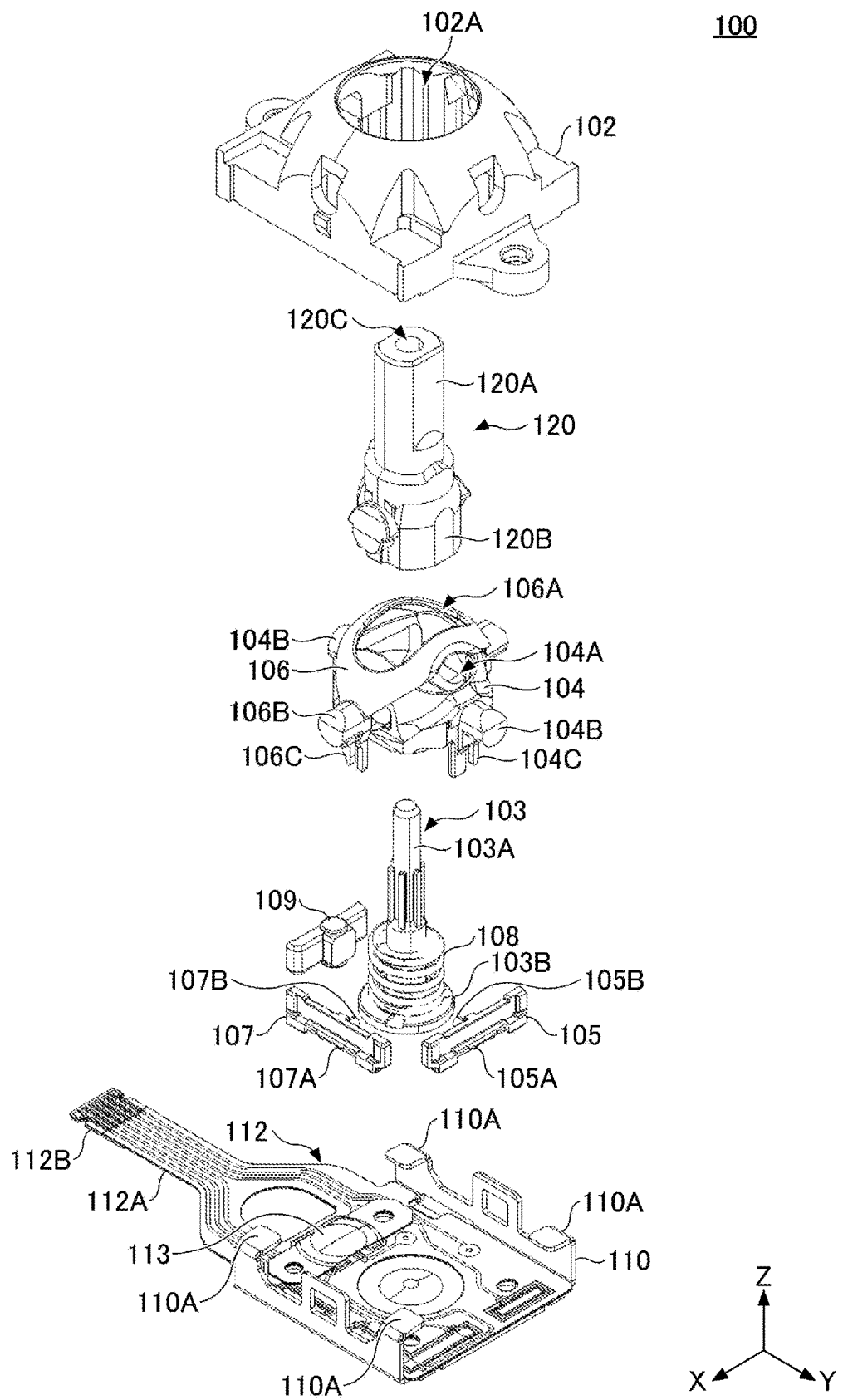
FIG. 3 is an exploded perspective view of the operation device according to the embodiment.
Figure 4:
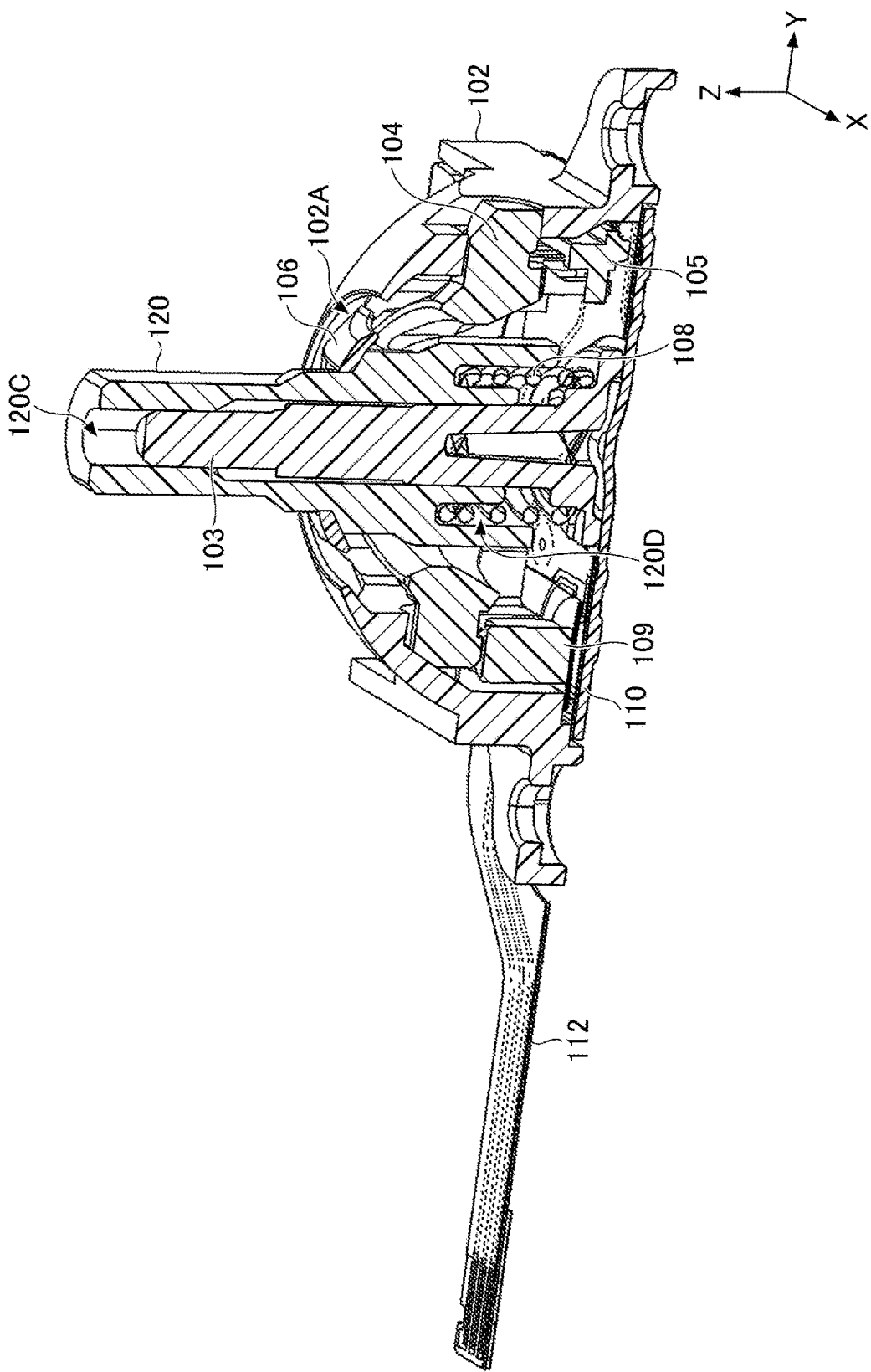
FIG. 4 is a cross-sectional view of the operation device according to the embodiment.

FIG. 2 is a perspective view of the exterior of the operation device 100 (from which the case 102 is removed) according to the embodiment. FIG. 3 is an exploded perspective view of the operation device 100 according to the embodiment. FIG. 4 is a cross-sectional view of the operation device 100 according to the embodiment.

As illustrated in FIG. 2 through FIG. 4, the operation device 100 includes the case 102, the lever 120, a second actuator 104, a first actuator 106, a shaft 103, a spring 108, a second holder 105, a first holder 107, a pressing member 109, a frame 110, the FPC 112, and a metal sheet 113.

The case 102 has a dome shape that protrudes upward. The components are assembled in the inner space of the case 102. The opening 102A, having a circular shape in a plan view when viewed from above, is formed in the top of a dome-shaped portion of the case 102.

The lever 120 is a member that is tilted by an operator. The lever 120 includes a lever portion 120A and a base portion 120B. The lever portion 120A is a substantially cylindrical portion that extends upward through the opening 102A of the case 102 and is tilted by the operator. The base portion 120B is a substantially cylindrical portion that supports the lower end of the lever portion 120A within the case 102, and rotates in accordance with the tilting of the lever portion 120A.

The second actuator 104 has a curved dome shape that protrudes upward. The second actuator 104 has an opening 104A having an elongated shape that extends in the left-right direction (the Y-axis direction in the drawings) along the curved dome shape. The second actuator 104 has a rotational shaft 104B that projects outward from both ends in the left-right direction. The rotational shaft 104B is supported by the case 102, such that the second actuator 104 is rotatable about the rotational shaft 104B in the front-rear direction (the X-axis direction in the drawings) in accordance with the tilting of the lever 120 in the front-rear direction (the X-axis direction in the drawings).

The first actuator 106 is provided on the top of the second actuator 104. The first actuator 106 has a curved dome shape that protrudes upward. The first actuator 106 has an opening 106A having an elongated shape that extends in the front-rear direction (the X-axis direction in the drawings) along the curved dome shape. The first actuator 106 has a rotational shaft 106B that projects outward from both ends in the front-rear direction. The rotational shaft 106B is supported by the case 102, such that the first actuator 106 is rotatable about the rotational shaft 106B in the left-right direction (the Y-axis direction in the drawings) in accordance with the tilting of the lever 120 in the left-right direction (the Y-axis direction in the drawings).

The second holder 105 is provided on the right side (the positive Y-axis side) of the second actuator 104. The second holder 105 holds a second slider 105A on the bottom surface thereof. The second holder 105 has an elongated shape that extends in the sliding direction (the X-axis direction) of the second slider 105A. The second holder 105 is provided so as to slide in the sliding direction (the X-axis direction) of the second slider 105A. A second protrusion 105B that has a cylindrical shape and protrudes toward the second actuator 104 is provided at the center of the side surface on the second actuator 104 side (the negative Y-axis side) of the second holder 105.

The first holder 107 is provided on the front side (the positive X-axis side) of the first actuator 106. The first holder 107 holds a first slider 107A on the bottom surface thereof. The first holder 107 has an elongated shape that extends in the sliding direction (the Y-axis direction) of the first slider 107A. The first holder 107 is provided so as to slide in the sliding direction (the Y-axis direction) of the first slider 107A. A first protrusion 107B that has a cylindrical shape and protrudes toward the first actuator 106 is provided at the center of the side surface on the first actuator 106 side (the negative X-axis side) of the first holder 107.

As illustrated in FIG. 2 through FIG. 4, the second actuator 104 and the first actuator 106 overlap each other such that the opening 104A and the opening 106A intersect each other. With the second actuator 104 and the first actuator 106 overlapping each other, the second actuator 104 and the first actuator 106 are assembled into the case 102 together with the base portion 120B of the lever 120. In this state, the lever portion 120A of the lever 120 passes through the opening 104A and the opening 106A, and the second actuator 104 and the first actuator 106 are combined with the base portion 120B.

The second actuator 104 includes a second engagement portion 104C that protrudes downward from the rotational shaft 104B situated on the positive Y-axis side. The second engagement portion 104C engages with the second protrusion 105B of the second holder 105. When the lever 120 is tilted in the front-rear direction (the X-axis direction), the second actuator 104 rotates in the front-rear direction together with the base portion 120B of the lever 120, and the second engagement portion 104C causes the second holder 105 to slide in the front-rear direction. Accordingly, the state of electrical connection between the second slider 105A, held on the bottom surface of the second holder 105, and resistors 116 and 117 provided on the FPC 112 changes, and an operation signal corresponding to the tilting (tilt direction and tilt angle) of the lever 120 in the front-rear direction, which is obtained from resistance values, is output from a connection portion 112B of the FPC 112.

The first actuator 106 includes a first engagement portion 106C that protrudes downward from the rotational shaft 106B situated on the positive X-axis side. The first engagement portion 106C engages with the first protrusion 107B of the first holder 107. When the lever 120 is tilted in the left-right direction (the Y-axis direction), the first actuator 106 rotates in the left-right direction together with the base portion 120B of the lever 120, and the first engagement portion 106C causes the first holder 107 to slide in the left-right direction. Accordingly, the state of electrical connection between the first slider 107A, held on the bottom surface of the first holder 107, and resistors 115 and 117 provided on the FPC 112 changes, and an operation signal corresponding to the tilting (tilt direction and tilt angle) of the lever 120 in the left-right direction, which is obtained from resistance values, is output from the connection portion 112B of the FPC 112.

The shaft 103 includes a shaft portion 103A and a bottom plate portion 103B. The shaft portion 103A is a cylinder-shaped portion that is inserted and arranged in a through hole 120C of the lever 120. The bottom plate portion 103B is a disc shaped portion that is integrated with the lower end of the shaft portion 103A.

With the shaft portion 103A of the shaft 103 being inserted, the spring 108 is assembled into an opening 120D (see FIG. 4) on the bottom side (the negative Z-axis side) of the lever 120 together with the shaft 103. The spring 108 preloads the lever 120 upward and preloads the bottom plate portion 103B of the shaft 103 downward. Therefore, when the tilting of the lever 120 is released by the operator, the spring 108 presses the bottom plate portion 103B of the shaft 103 against the top surface and a center portion of the frame 110 so as to bring the bottom plate portion 103B into a horizontal state, thereby causing the lever 120 to return to a neutral position.

When the lever 120 is pressed down, the pressing member 109 is pressed down by the rotational shaft 104B on the negative Y-axis side of the second actuator 104. As a result, the pressing member 109 causes the metal sheet 113 provided on the FPC 112 to be pressed down and elastically deformed, thereby bringing a switch circuit formed on the FPC 112 into an electrically conductive state. Accordingly, the FPC 112 outputs a switch-on signal indicating that the lever 120 has been pressed down.

The frame 110 is a flat member made of a metal and configured to close the opening on the bottom surface side of the case 102. For example, the frame 110 is formed by subjecting a metal plate to various processing methods (such as punching, bending, or the like). The frame 110 is provided with a pair of claw portions 110A on both the front edge (the positive X-axis side) and the rear edge (the negative X-axis side) of the frame 110. As illustrated in FIG. 1, the claw portions 110A engage with edge portions of the case 102 such that the frame 110 is fixedly coupled to the case 102.

The FPC 112 is an example of a "substrate", and is a flexible, film-shaped wiring member. The FPC 112 includes an extension portion 112A that extends from the top surface of the frame 110 in the left-right direction (toward the negative Y-axis side in the drawings), and is connected to the outside via the connection portion 112B provided on the tip of the extension portion 112A. The FPC 112 transmits, to the outside, an operation signal corresponding to the operation (tilting and pressing) of the lever 120. The FPC 112 is formed by covering both surfaces of a strip-shaped conductor wire (for example, copper foil) with a flexible and insulating material (for example, polyimide resin or polyethylene terephthalate (PET)).

(Configuration of FPC 112)

Figure 5:
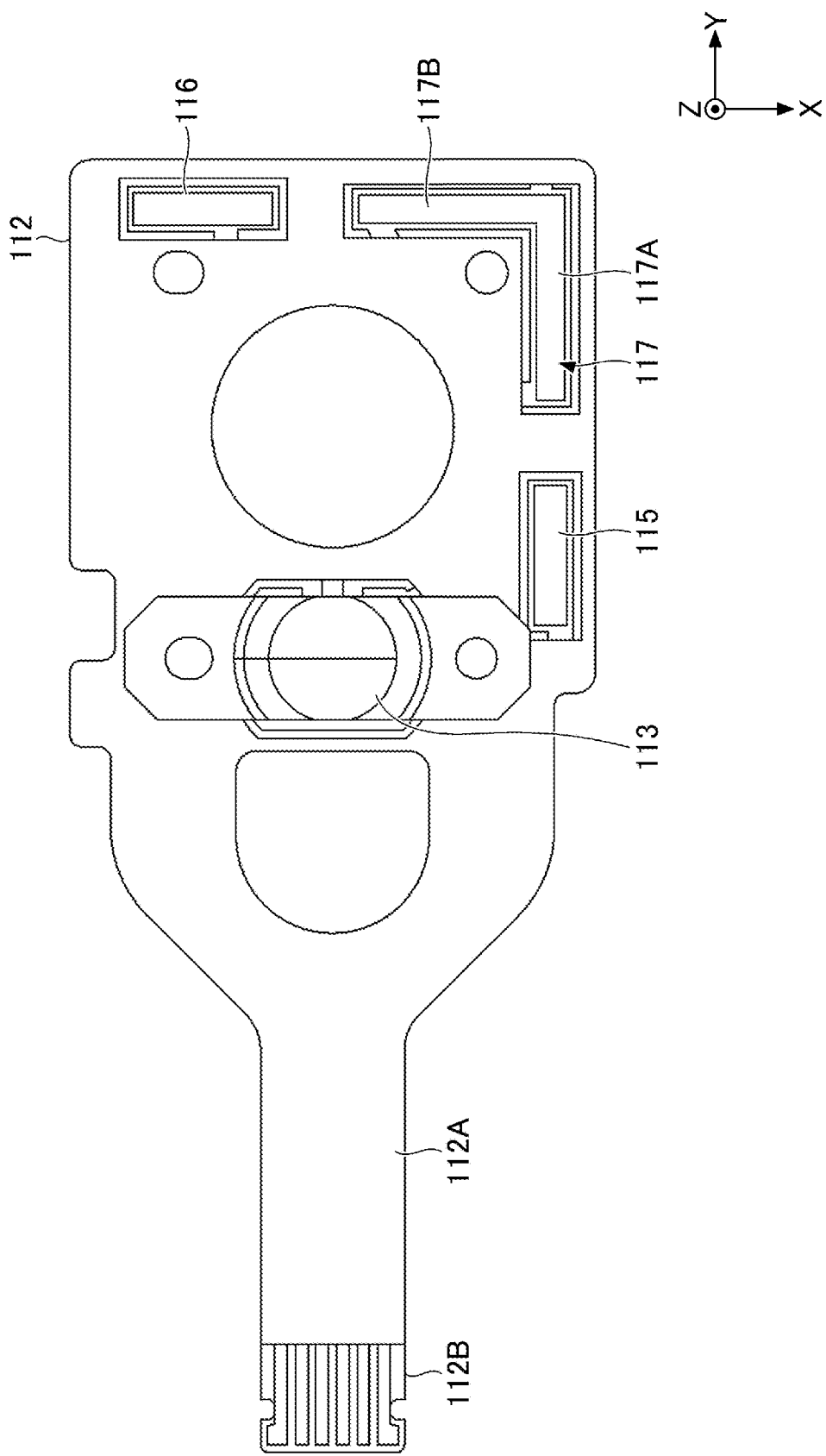
FIG. 5 is a plan view of an FPC of the operation device according to the embodiment.

FIG. 5 is a plan view of the FPC 112 of the operation device 100 according to the embodiment. As illustrated in FIG. 5, the resistor 115, the resistor 116, and the resistor 117, all of which have a flat strip shape, are disposed on the surface of the FPC 112. For example, each of the resistor 115, the resistor 116, and the resistor 117 is formed by using a carbon fiber material to be printed in the form of a thin film.

The resistor 115 is provided along the edge on the front side (the positive X-axis side) of the FPC 112. The resistor 115 has a strip shape that extends linearly in the left-right direction (the Y-axis direction).

The resistor 116 is provided along the edge on the right side (the positive Y-axis side) of the FPC 112. The resistor 116 has a strip shape that extends linearly in the front-rear direction (the X-axis direction).

The resistor 117 is provided along the corner between the front side (the positive X-axis side) and the right side (the positive Y-axis side of the FPC 112. The resistor 117 has an L-shape composed of a linear portion 117A and a linear portion 117B. The linear portion 117A has a strip shape that extends linearly in the left-right direction (the Y-axis direction). The linear portion 117B has a strip shape that extends linearly in the front-rear direction (the X-axis direction).

(Sliding Configuration of Sliders 105A and 107A)

Figure 6:
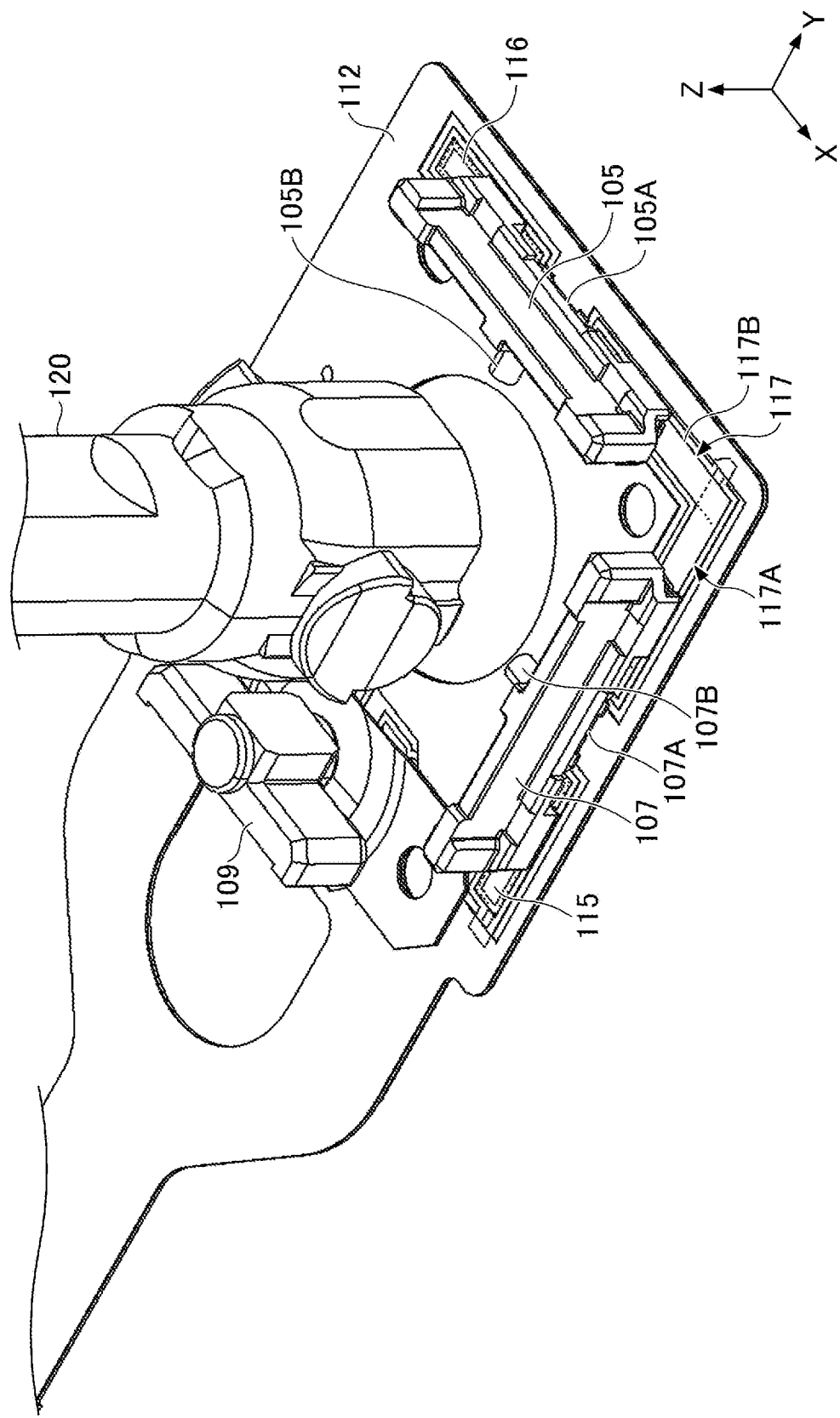
FIG. 6 is a drawing illustrating the arrangement of sliders on the surface of the FPC according to the embodiment.
Figure 7:
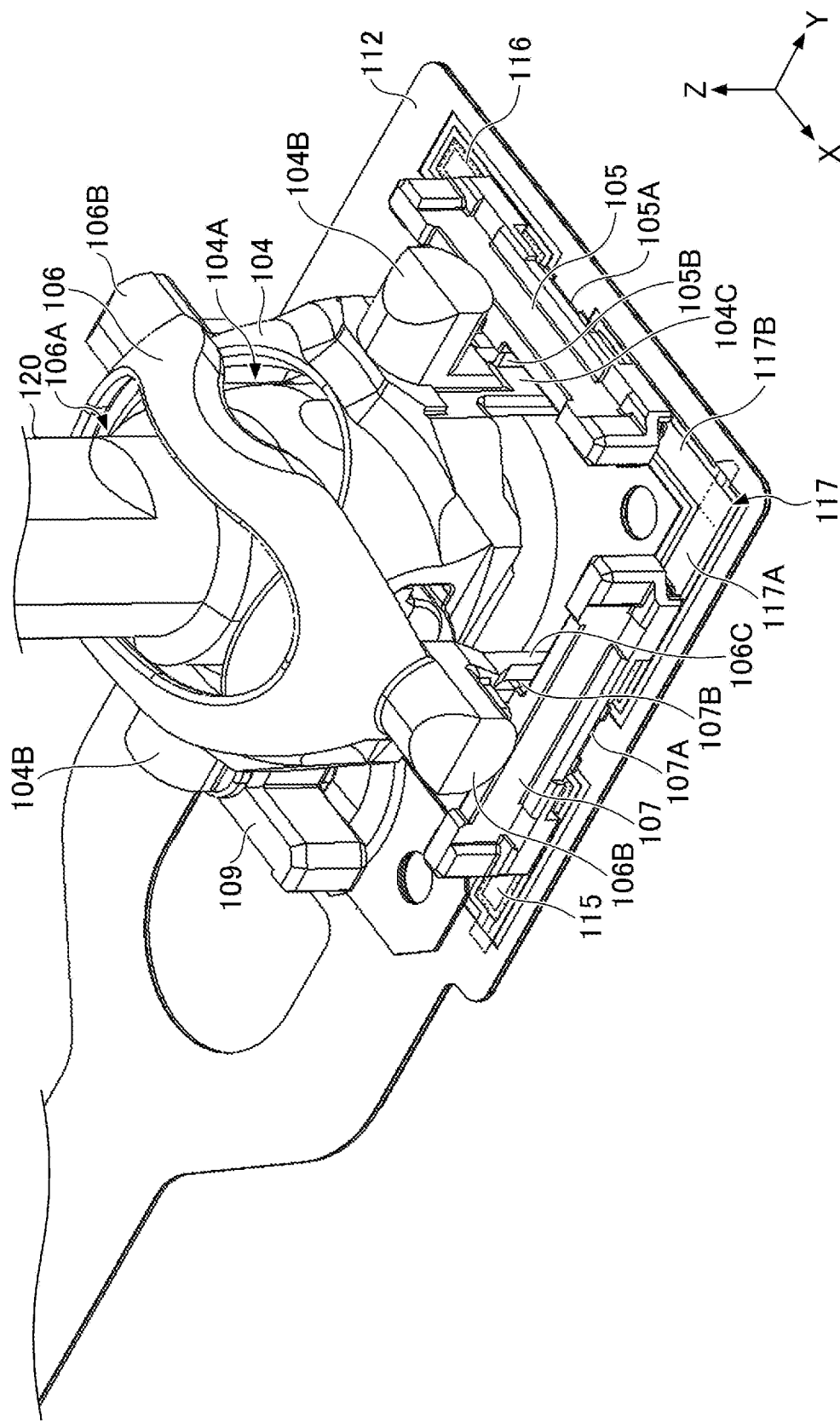
FIG. 7 is a drawing illustrating the state of engagement between the sliders and actuators when viewed from above according to the embodiment.
Figure 8:
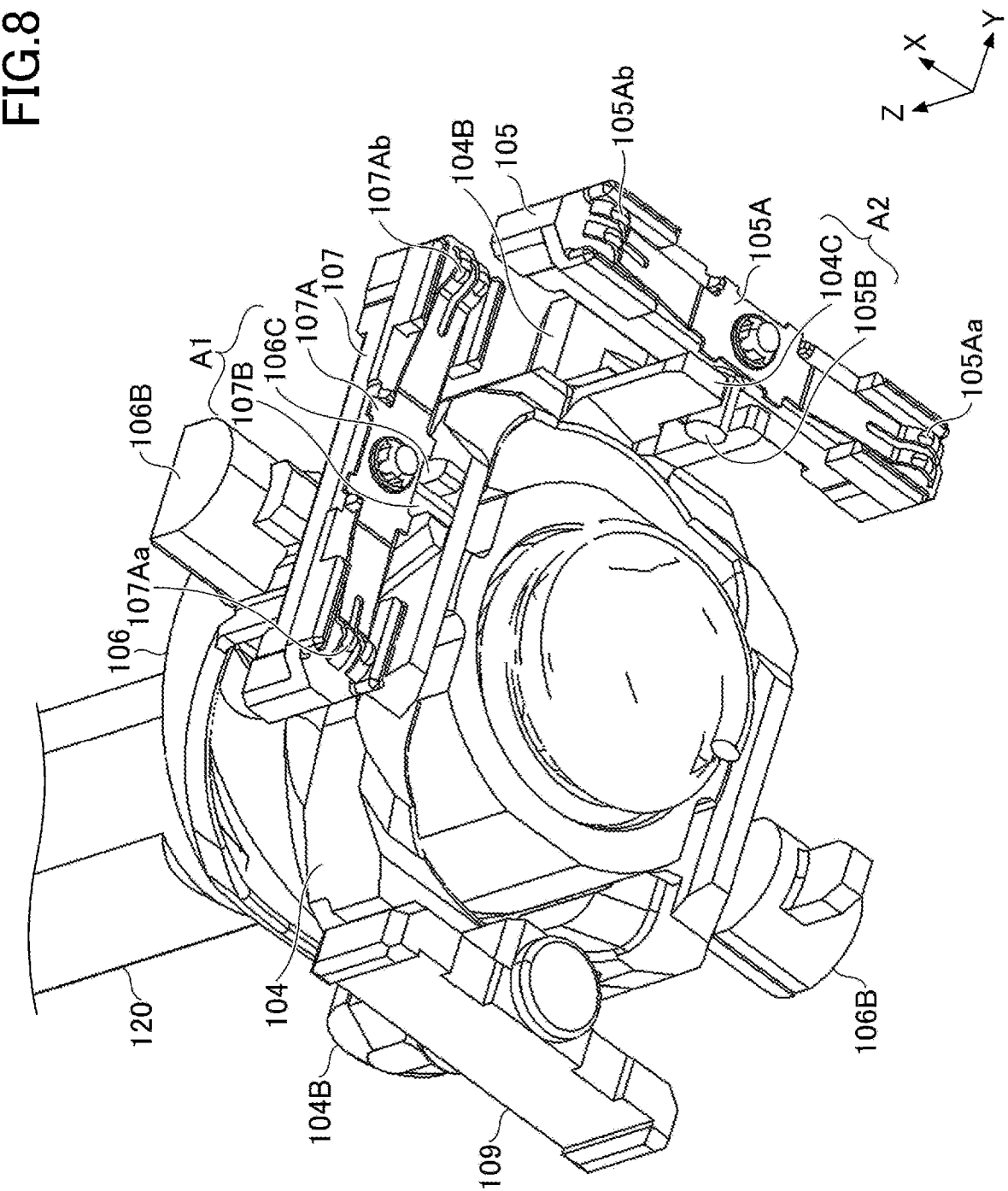
FIG. 8 is a drawing illustrating the state of engagement between the sliders and the actuators when viewed from below according to the embodiment.

FIG. 6 is a drawing illustrating the arrangement of the sliders 105 A and 107 A on the surface of the FPC 112 according to the embodiment. FIG. 7 is a drawing illustrating the state of engagement between the sliders 105A and 107A and the actuators 104 and 106 when viewed from above according to the embodiment. FIG. 8 is a drawing illustrating the state of engagement between the sliders 105A and 107A and the actuators 104 and 106 when viewed from below according to the embodiment.

As illustrated in FIG. 6, the linear portion 117A of the resistor 117 and the resistor 115 are arranged spaced apart from each other on the surface of the FPC 112 and are disposed linearly in the Y-axis direction along the edge on the front side (on the positive X-axis side) of the FPC 112. As illustrated in FIG. 6, the first holder 107 is disposed across the surface of the linear portion 117A of the resistor 117 and the surface of the resistor 115. The first slider 107A, made of a metal and having a leaf spring shape, is provided on the bottom surface of the first holder 107. The first slider 107A slides on the surfaces of the linear portion 117A and the resistor 115 (an example of a "first resistor") in accordance with the movement of the first holder 107 in the Y-axis direction. Specifically, a contact portion 107Aa (see FIG. 8), provided at the end on the negative Y-axis side of the first slider 107A, slides on the surface of the resistor 115. In addition, a contact portion 107Ab (see FIG. 8), provided at the end on the positive Y-axis side of the first slider 107A, slides on the surface of the linear portion 117A.

As illustrated in FIG. 6, the linear portion 117B of the resistor 117 and the resistor 116 are arranged spaced apart from each other on the surface of the FPC 112 and are disposed linearly in the X-axis direction along the edge on the right side (on the positive Y-axis side) of the FPC 112. As illustrated in FIG. 6, the second holder 105 is disposed across the surface of the linear portion 117B of the resistor 117 and the surface of the resistor 116. The second slider 105A, made of a metal and having a leaf spring shape, is provided on the bottom surface of the second holder 105. The second slider 105A slides on the surfaces of the linear portion 117B and the resistor 116 (an example of a "second resistor") in accordance with the movement of the second holder 105 in the X-axis direction. Specifically, a contact portion 105Aa (see FIG. 8), provided at the end on the negative X-axis side of the second slider 105A, slides on the surface of the resistor 116. In addition, a contact portion 105Ab (see FIG. 8), provided at the end on the positive X-axis side of the second slider 105A, slides on the surface of the linear portion 117B.

As illustrated in FIG. 6 through FIG. 8, the second protrusion 105B is provided at the center of the side surface on the second actuator 104 side (the negative Y-axis side) of the second holder 105. The second protrusion 105B has a cylindrical shape and protrudes toward the second actuator 104 (the negative Y-axis side). As illustrated in FIG. 6 through FIG. 8, the second protrusion 105B engages with the second engagement portion 104C of the second actuator 104. The second protrusion 105B of the second holder 105 and the second engagement portion 104C of the second actuator 104 constitute a second drive transmission part A2. With this configuration, the second holder 105 moves in the front-rear direction (the X-axis direction) via the second drive transmission part A2 in accordance with the rotation of the second actuator 104. At this time, the second slider 105A, held by the second holder 105, slides in the front-rear direction (the X-axis direction) on the surfaces of the linear portion 117B and the resistor 116.

As illustrated in FIG. 6 through FIG. 8, the first protrusion 107B is provided at the center of the side surface on the first actuator 106 side (the negative X-axis side) of the first holder 107. The first protrusion 107B has a cylindrical shape and protrudes toward the first actuator 106 (the negative X-axis side). As illustrated in FIG. 6 through FIG. 8, the first protrusion 107B engages with the first engagement portion 106C of the first actuator 106. The first protrusion 107B of the first holder 107 and the first engagement portion 106C of the first actuator 106 constitute a first drive transmission part A1. With this configuration, the first holder 107 moves in the left-right direction (the Y-axis direction) via the first drive transmission part A1 in accordance with the rotation of the first actuator 106. At this time, the first slider 107A, held by the first holder 107, slides in the left-right direction (the Y-axis direction) on the surfaces of the linear portion 117A and the resistor 115.

With the above-described configuration, in the operation device 100 according to the embodiment, the first slider 107A slides in the left-right direction (the Y-axis direction) on the surfaces of the linear portion 117A and the resistor 115 in accordance with the tilting of the lever 120 in the left-right direction (the Y-axis direction). Accordingly, the resistance value between a terminal connected to the resistor 117 and a terminal connected to the resistor 115 changes in accordance with the amount of movement of the first slider 107A (that is, the tilt angle of the lever 120). An external device can detect the tilting and the tilt angle of the lever 120 in the left-right direction (the Y-axis direction) based on the change in the resistance value between the two terminals.

Further, in the operation device 100 according to the embodiment, the second slider 105A slides in the front-rear direction (the X-axis direction) on the surfaces of the linear portion 117B and the resistor 116 in accordance with the tilting of the lever 120 in the front-rear direction (the X-axis direction). Accordingly, the resistance value between the terminal connected to the resistor 117 and a terminal connected to the resistor 116 changes in accordance with the amount of movement of the second slider 105A (that is, the tilt angle of the lever 120). The external device can detect the tilting and the tilt angle of the lever 120 in the front-rear direction (the X-axis direction) based on the change in the resistance value between the two terminals.

(Configuration of First Drive Transmission Part A1)

Figure 9:
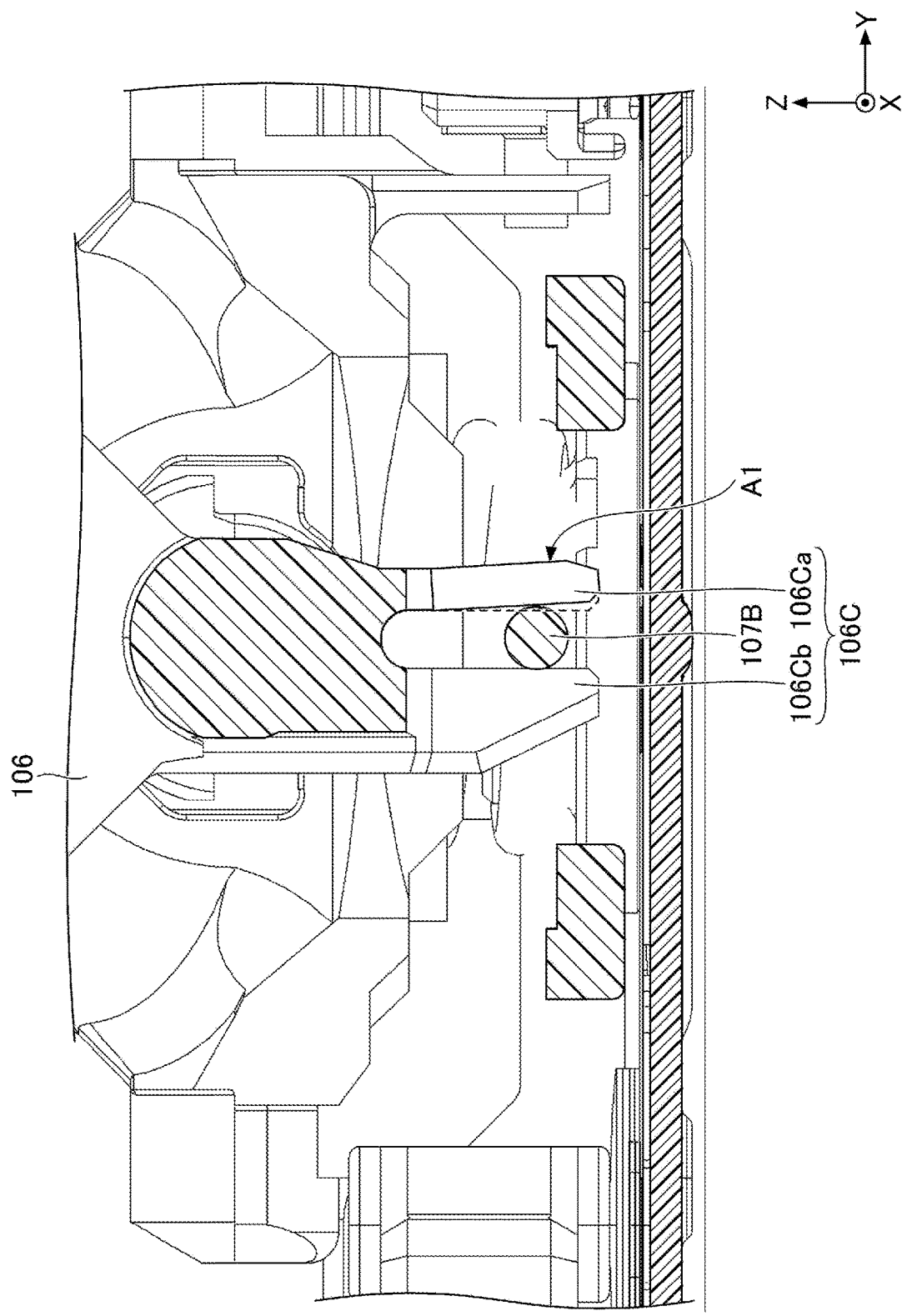
FIG. 9 is a cross-sectional view illustrating the configuration of a first drive transmission part according to the embodiment.

FIG. 9 is a cross-sectional view illustrating the configuration of the first drive transmission part A1 according to the embodiment. As illustrated in FIG. 9, the first drive transmission part A1 is constituted by the first protrusion 107B of the first holder 107 and the first engagement portion 106C of the first actuator 106. As illustrated in FIG. 9, the first engagement portion 106C includes a pair of holding pieces 106Ca and 106Cb configured to hold the first protrusion 107B from both sides in the left-right direction (the Y-axis direction).

As indicated by a dotted line in FIG. 9, in a state in which the first protrusion 107B is not held by the pair of holding pieces 106Ca and 106Cb, the distance between the one holding piece 106Ca and the other holding piece 106Cb is smaller than the diameter of the first protrusion 107B.

The width of the one holding piece 106Ca in the left-right direction (the Y-axis direction) is smaller than the width of the other holding piece 106Cb in the left-right direction (the Y-axis direction). Therefore, the one holding piece 106Ca is more elastic than the other holding piece 106Cb.

Therefore, as indicated by a solid line in FIG. 9, when the first protrusion 107B is fitted between the one holding piece 106Ca and the other holding piece 106Cb, the one holding piece 106Ca is elastically deformed toward the positive Y-axis side such that the first protrusion 107B is held by the pair of holding pieces 106Ca and 106Cb.

Accordingly, because there is no clearance between the first protrusion 107B of the first holder 107 and the first engagement portion 106C of the first actuator 106, the operation device 100 according to the embodiment can eliminate looseness between the first protrusion 107B and the first engagement portion 106C. Therefore, the operation device 100 according to the embodiment can return the first holder 107 to the neutral position in the Y-axis direction when the lever 120 returns to the neutral position in the Y-axis direction, and can output a value indicating the neutral position in the Y-axis direction as an output value of an output signal. Therefore, in the operation device 100 according to the embodiment, the accuracy of an output value of an output signal, indicating the neutral position in the Y-axis direction when the lever 120 returns to the neutral position in the Y-axis direction, can be improved.

In particular, in the operation device 100 according to the embodiment, the other holding piece 106Cb is not elastically deformed such that the first holder 107 can return to the neutral position with high accuracy by using the other holding piece 106Cb as a reference position.

Further, the operation device 100 according to the embodiment can appropriately adjust the holding force of the pair of holding pieces 106Ca and 106Cb exerted on the first protrusion 107B by causing the one holding piece 106Ca to be elastically deformed. Therefore, scraping and the like of the outer peripheral surface of the first protrusion 107B can be reduced.

(Configuration of Second Drive Transmission Part A2)

Figure 10:
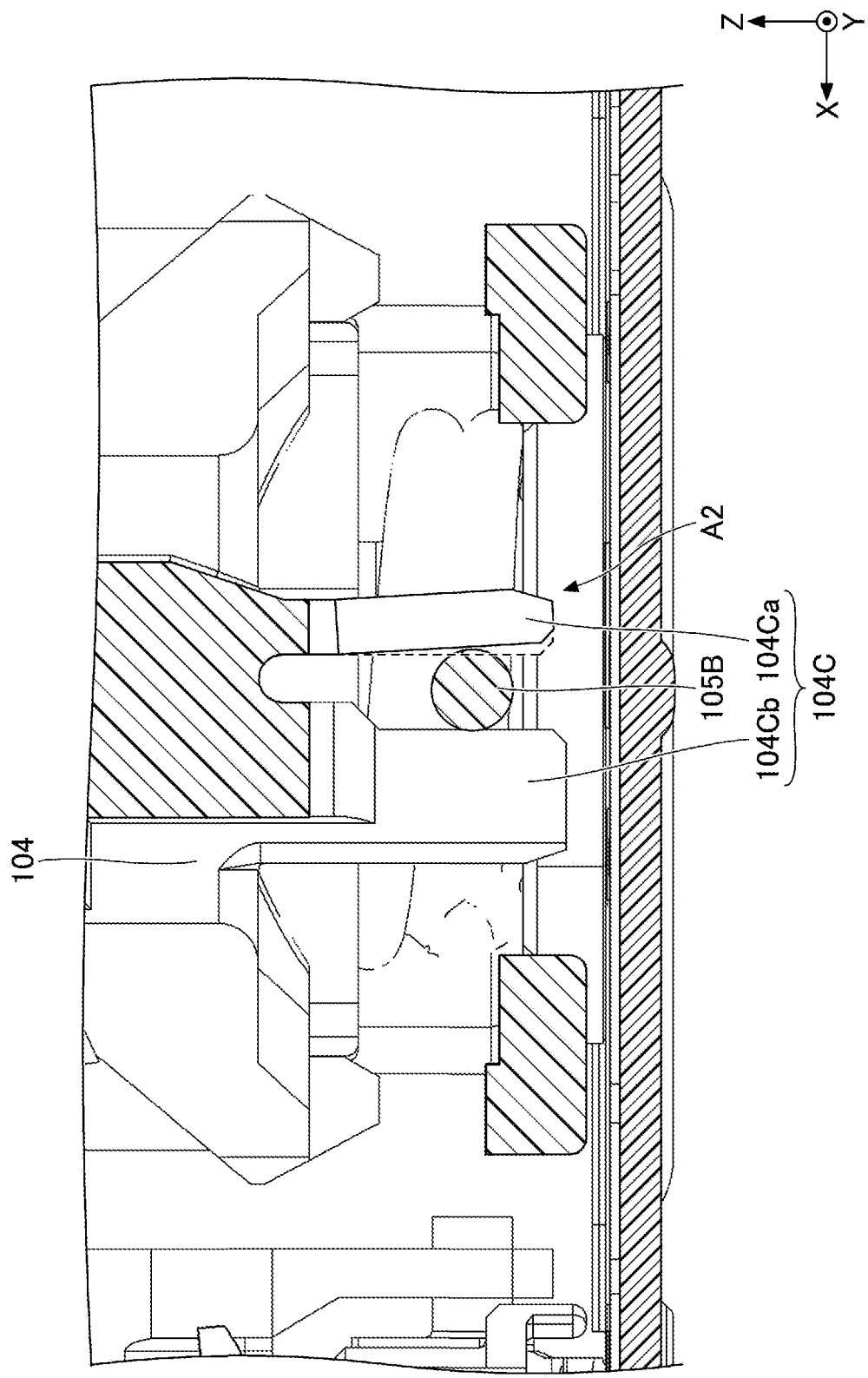
FIG. 10 is a cross-sectional view illustrating the configuration of a second drive transmission part according to the embodiment.

FIG. 10 is a cross-sectional view illustrating the configuration of the second drive transmission part A2 according to the embodiment. As illustrated in FIG. 10, the second drive transmission part A2 is constituted by the second protrusion 105B of the second holder 105 and the second engagement portion 104C of the second actuator 104. As illustrated in FIG. 10, the second engagement portion 104C includes a pair of holding pieces 104Ca and 104Cb configured to hold the second protrusion 105B from both sides in the front-rear direction (the X-axis direction).

As indicated by a dotted line in FIG. 10, in a state in which the second protrusion 105B is not held by the pair of holding pieces 104Ca and 104Cb, the distance between the one holding piece 104Ca and the other holding piece 104Cb is smaller than the diameter of the second protrusion 105B.

The width of the one holding piece 104Ca in the front-rear direction (the X-axis direction) is smaller than the width of the other holding piece 104Cb in the front-rear direction (the X-axis direction). Therefore, the one holding piece 104Ca is more elastic than the other holding piece 104Cb.

Therefore, as indicated by a solid line in FIG. 10, when the second protrusion 105B is fitted between the one holding piece 104Ca and the other holding piece 104Cb, the one holding piece 104Ca is elastically deformed toward the negative X-axis side such that the second protrusion 105B is held by the holding pieces 104Ca and 104Cb.

Accordingly, because there is no clearance between the second protrusion 105B of the second holder 105 and the second engagement portion 104C of the second actuator 104, the operation device 100 according to the embodiment can eliminate looseness between the second protrusion 105B and the second engagement portion 104C. Therefore, the operation device 100 according to the embodiment can return the second holder 105 to the neutral position in the X-axis direction when the lever 120 returns to the neutral position in the X-axis direction, and can output a value indicating the neutral position in the X-axis direction as an output value of an output signal. Therefore, in the operation device 100 according to the embodiment, the accuracy of an output value of an output signal, indicating the neutral position in the X-axis direction when the lever 120 returns to the neutral position in the X-axis direction, can be improved.

In particular, in the operation device 100 according to the embodiment, the other holding piece 104Cb is not elastically deformed such that the second holder 105 can return to the neutral position with high accuracy by using the holding piece 104Cb as a reference position.

Further, the operation device 100 according to the embodiment can appropriately adjust the holding force of the pair of holding pieces 104Ca and 104Cb exerted on the second protrusion 105B by causing the one holding piece 104Ca to be elastically deformed. Therefore, scraping and the like of the outer peripheral surface of the second protrusion 105B can be reduced.

As illustrated in FIG. 10, in the operation device 100 according to the embodiment, the distance (groove width) between upper portions of the holding pieces 104Ca and 104Cb is smaller than lower portions of the holding pieces 104Ca and 104Cb. Accordingly, in the operation device 100 according to the embodiment, only a lower portion of the one holding piece 104Ca can be partially deformed.

(Methods for Fixing Sliders 105A and 107A According to Modifications)

The second slider 105A is fixed to the bottom surface of the second holder 105. Similarly, the first slider 107A is fixed to the bottom surface of the first holder 107. In the following, methods for fixing the sliders 105A and 107A will be described.

<First Modification>

Figure 11:
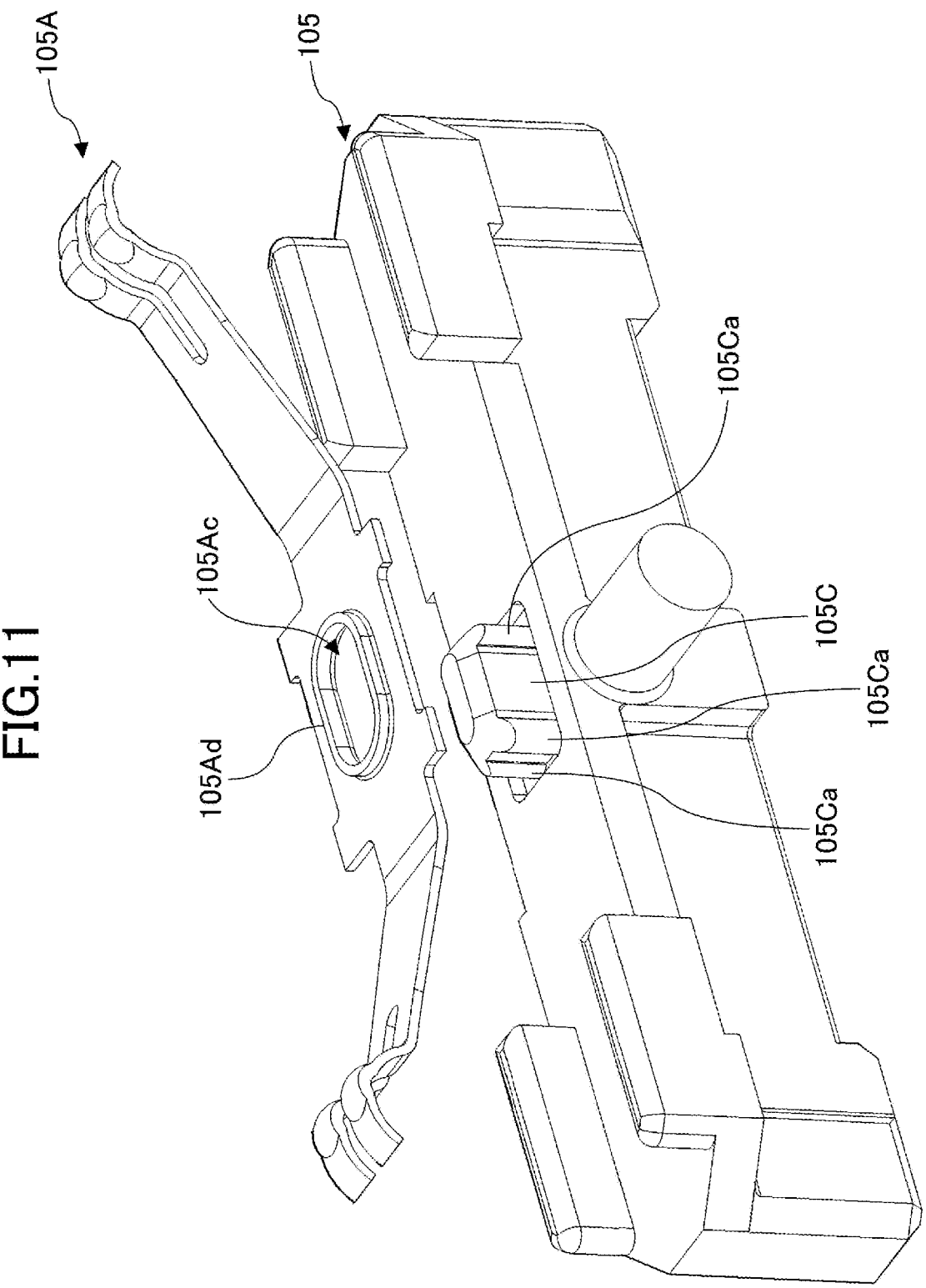
FIG. 11 is a perspective view of the exterior of a second holder and a second slider (not coupled with each other) when viewed from below according to a first modification.
Figure 12:
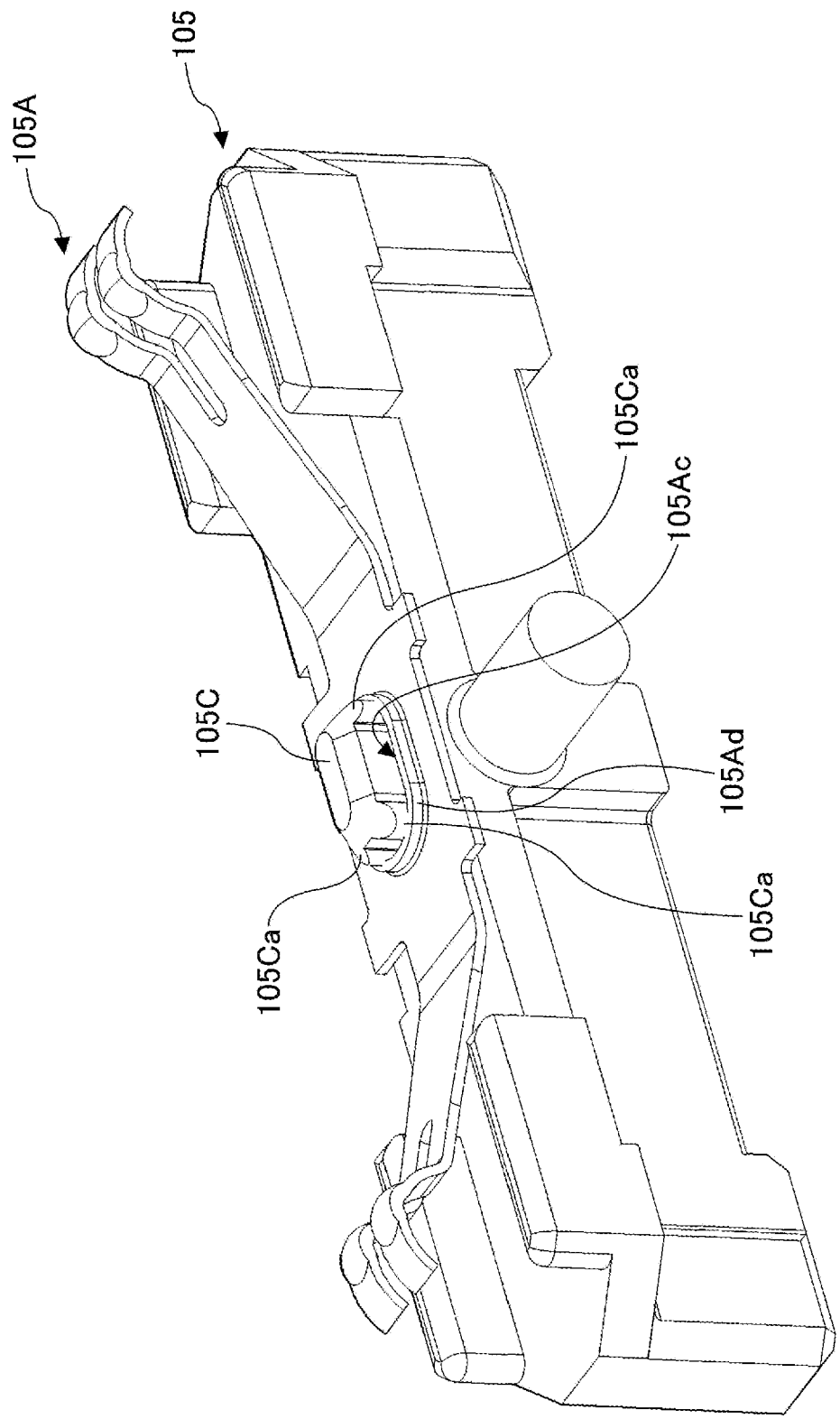
FIG. 12 is a perspective view of the exterior of the second holder and the second slider (coupled with each other) when viewed from below according to the first modification.
Figure 13:
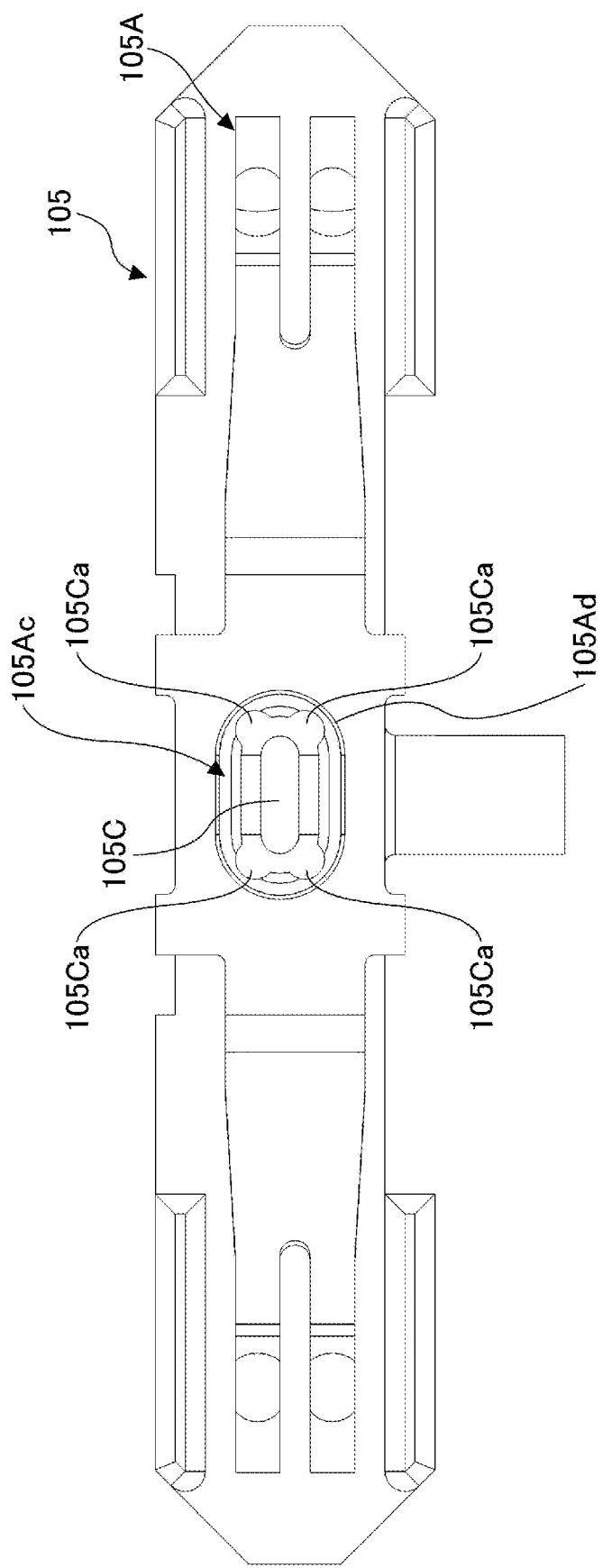
FIG. 13 is a plan view of the second holder and the second slider (coupled with each other) when viewed from below according to the first modification.

FIG. 11 is a perspective view of the exterior of a second holder 105 and a second slider 105A (not coupled with each other) when viewed from below according to a first modification. FIG. 12 is a perspective view of the exterior of the second holder 105 and the second slider 105A (coupled with each other) when viewed from below according to the first modification. FIG. 13 is a plan view of the second holder 105 and the second slider 105A (coupled with each other) when viewed from below according to the first modification.

As illustrated in FIG. 11 through FIG. 13, a fitting protrusion 105C is provided in the center of the bottom surface of the second holder 105. The fitting protrusion 105C has a columnar shape and protrudes downward. Further, a fitting hole 105Ac is provided in the center of the second slider 105A. As illustrated in FIG. 12 and FIG. 13, the fitting protrusion 105C of the second holder 105 is pressed into the fitting hole 105Ac, thereby fixing the second slider 105A to the bottom surface of the second holder 105.

As illustrated in FIG. 11 through FIG. 13, each of the fitting protrusion 105C and the fitting hole 105Ac has an elongated circular shape in a plan view, with the longer side being in the extending direction of the second holder 105. The second slider 105A according to the first modification does not readily rotate with respect to the bottom surface of the second holder 105 because the fitting protrusion 105C is pressed into the fitting hole 105Ac.

As illustrated in FIG. 11 through FIG. 13, the fitting protrusion 105C according to the first modification is provided with a plurality of protrusions that protrude outward from the outer peripheral edge of the elongated circular-shaped fitting protrusion 105C. In the example illustrated in FIG. 11 through FIG. 13, a pair of protrusions 105Ca are provided on a curved surface on one side in the long-side direction of the fitting protrusion 105C, and a pair of protrusions 105Ca are provided on a curved surface on the other side in the long-side direction of the fitting protrusion 105C. That is, four protrusions 105Ca are provided on the four corners of the fitting protrusion 105C. Therefore, the fitting protrusion 105C according to the first modification is partially larger than the fitting hole 105Ac, and thus, the fitting protrusion 105C can be pressed and fixed into the fitting hole 105Ac.

As illustrated in FIG. 11 through FIG. 13, a thick portion 105Ad having an increased thickness is formed over the entire inner peripheral edge of the fitting hole 105Ac according to the first modification (that is, the thick portion 105Ad has an elongated circular shape in a plan view). Accordingly, while the thickness of the entire second slider 105A according to first modification is small, the strength of the inner peripheral edge of the fitting hole 105Ac is increased and the fitting hole 105Ac is not readily deformed. Therefore, the fitting protrusion 105C can be easily pressed into the fitting hole 105Ac.

<Second Modification>

Figure 14:
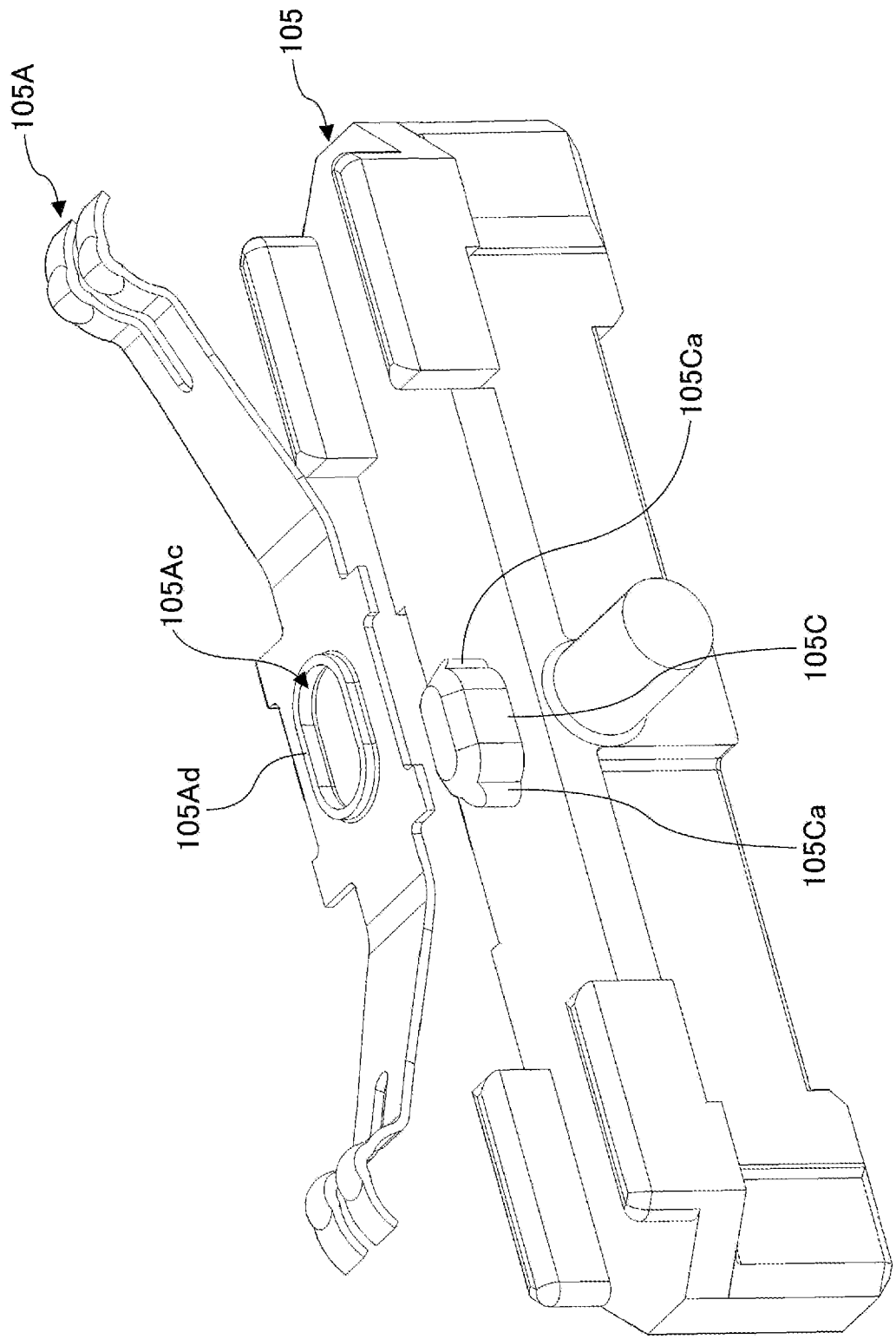
FIG. 14 is a perspective view of the exterior of a second holder and a second slider (not coupled with each other) when viewed from below according to a second modification.
Figure 15:
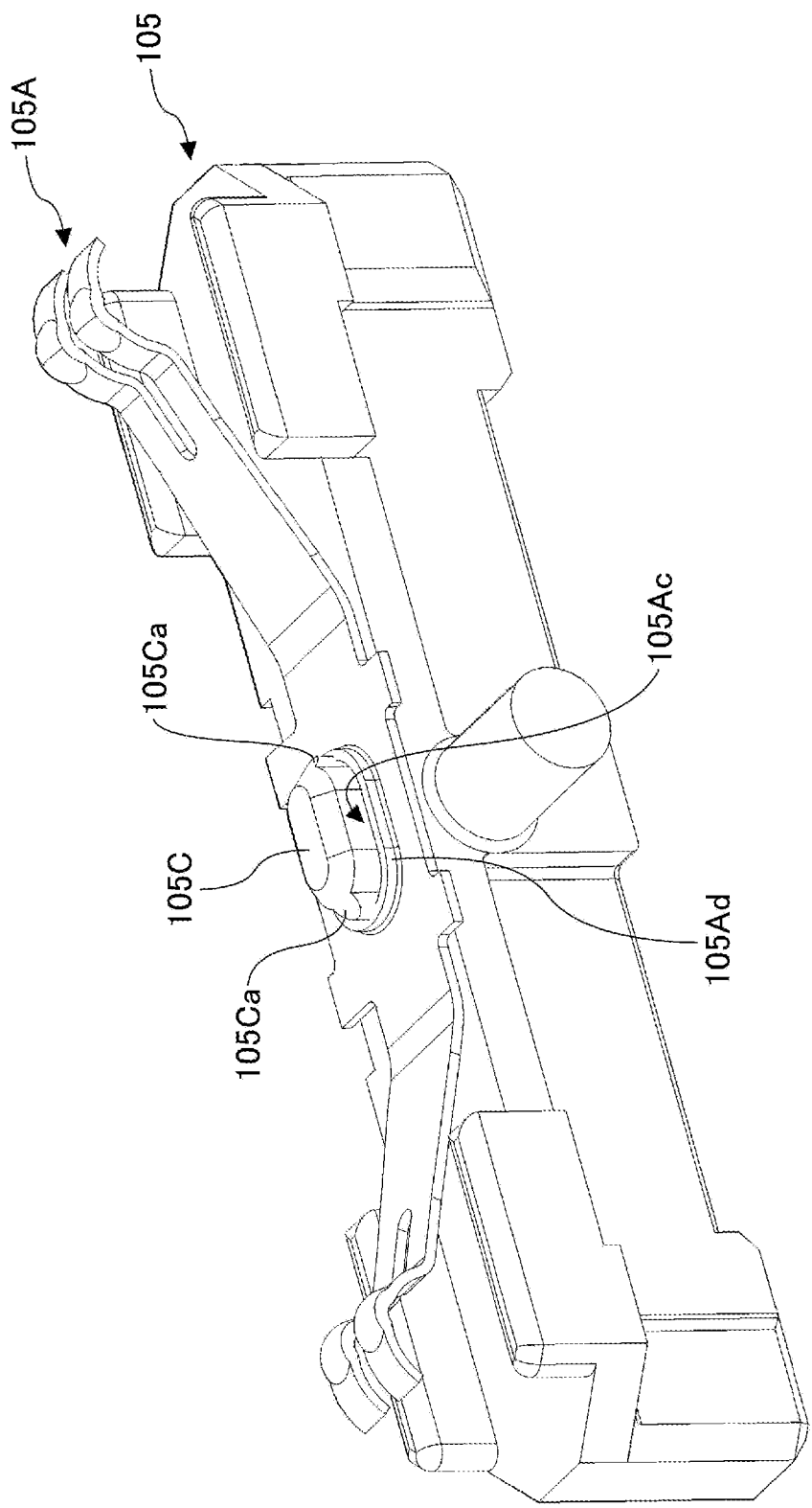
FIG. 15 is a perspective view of the exterior of the second holder and the second slider (coupled with each other) when viewed from below according to the second modification.
Figure 16:
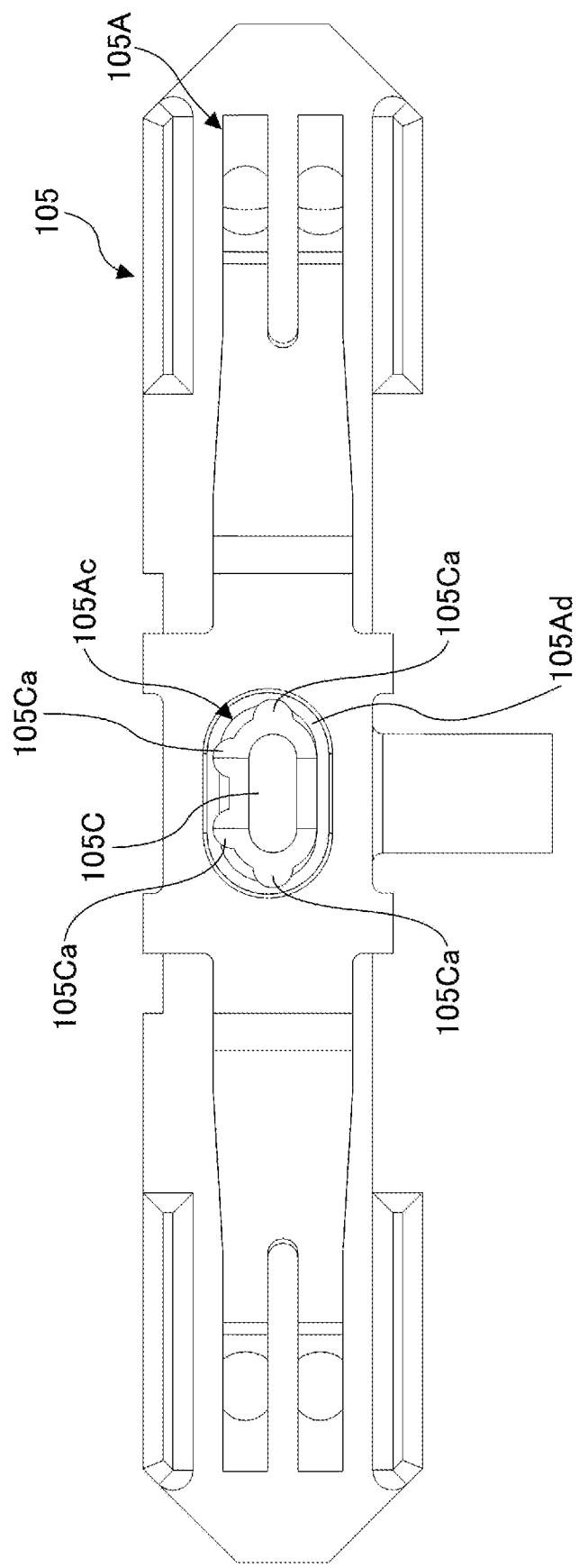
FIG. 16 is a plan view of the second holder and the second slider (coupled with each other) when viewed from below according to the second modification.

FIG. 14 is a perspective view of the exterior of a second holder 105 and a second slider 105A (not coupled with each other) when viewed from below according to a second modification. FIG. 15 is a perspective view of the exterior of the second holder 105 and the second slider 105A (coupled with each other) when viewed from below according to the second modification. FIG. 16 is a plan view of the second holder 105 and the second slider 105A (coupled with each other) when viewed from below according to the second modification.

In the second modification, the arrangement of a plurality of protrusions 105Ca of a fitting protrusion 105C differs from that of the first modification.

As illustrated in FIG. 14 through FIG. 16, one protrusion 105Ca is provided at the center of a curved surface on one side in the long-side direction of the fitting protrusion 105C according to the second modification, and one protrusion 105Ca is provided at the center of a curved surface on the other side in the long-side direction of the fitting protrusion 105C. In addition, as illustrated in FIG. 14 through FIG. 16, a pair of protrusions 105Ca is provided on a flat surface on one side in the short-side direction of the fitting protrusion 105C according to the second modification. That is, four protrusions 105Ca are provided at respective positions of the fitting protrusion 105C according to the second modification. Therefore, the fitting protrusion 105C according to the second modification is slightly larger than the fitting hole 105Ac both in the long-side direction and the short-side direction thereof. Thus, the fitting protrusion 105C can be pressed and inserted into the fitting hole 105Ac. In particular, the fitting protrusion 105C according to the second modification is not provided with a protrusion 105Ca on a flat surface on the other side in the short-side direction of the fitting protrusion 105C. Therefore, the flat surface on the other side in the short-side direction of the fitting protrusion 105C can be used to accurately position the fitting protrusion 105C with respect to the fitting hole 105Ac.

<Third Modification>

Figure 17:
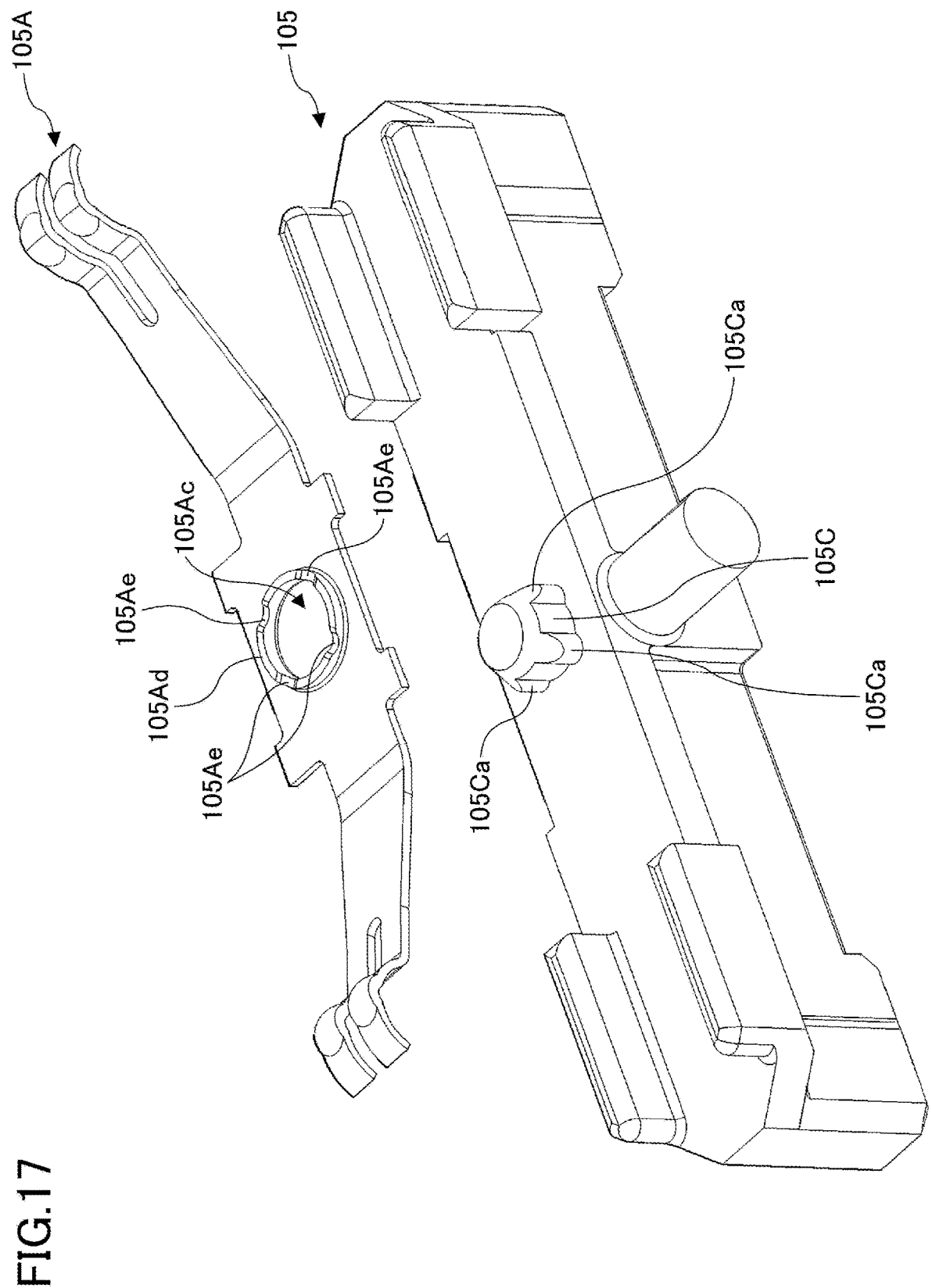
FIG. 17 is a perspective view of the exterior of a second holder and a second slider (not coupled with each other) when viewed from below according to a third modification.
Figure 18:
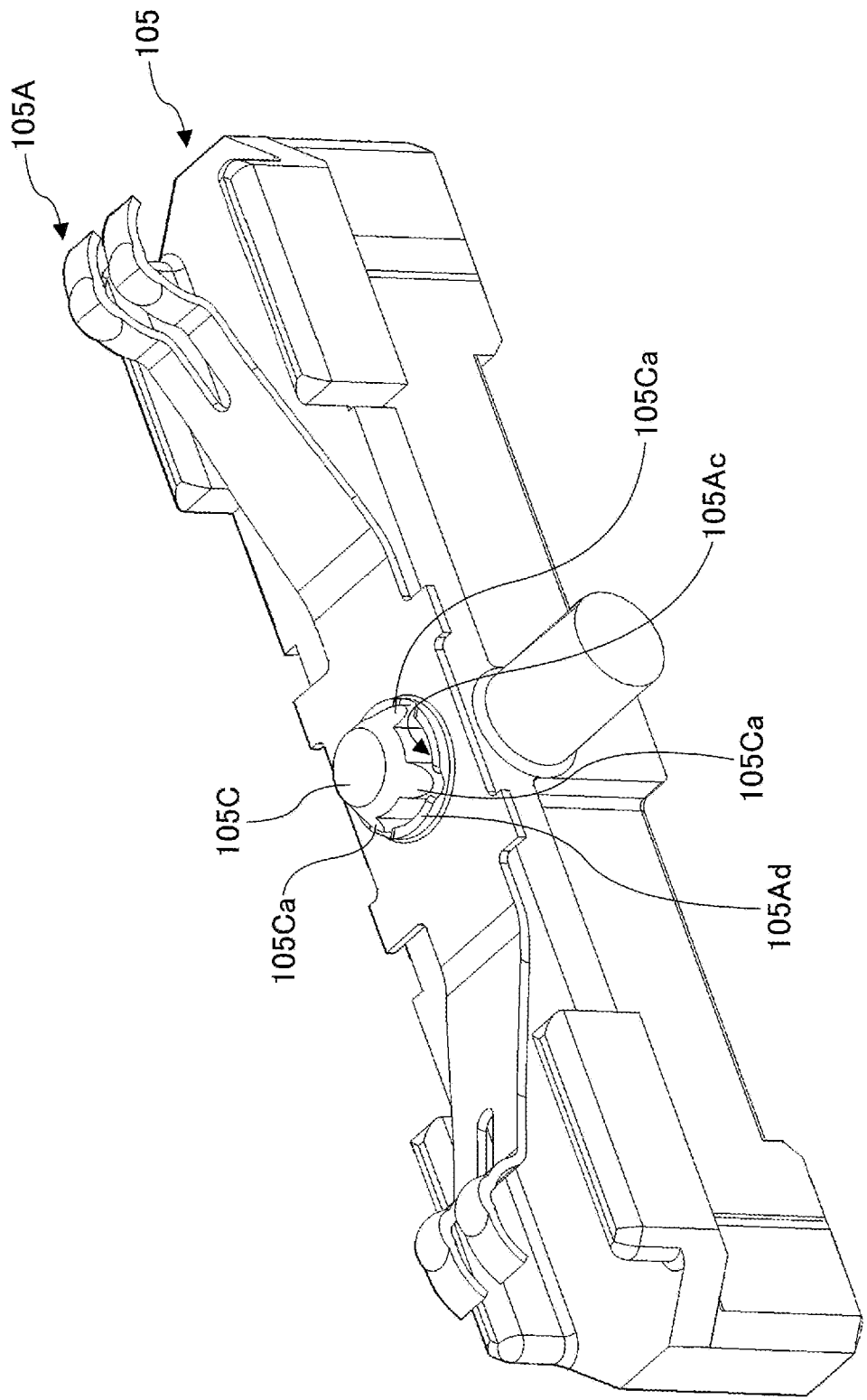
FIG. 18 is a perspective view of the exterior of the second holder and the second slider (coupled with each other) when viewed from below according to the third modification.
Figure 19:
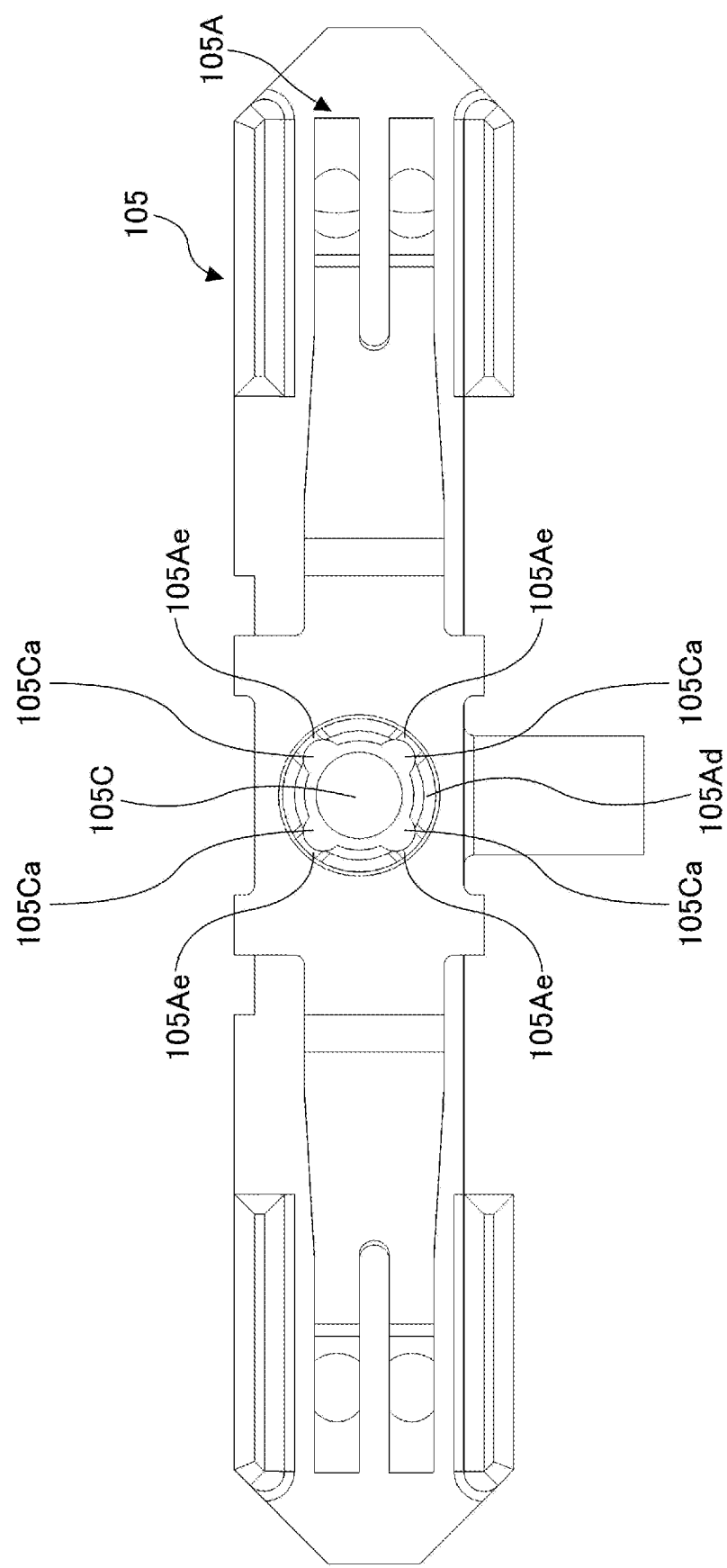
FIG. 19 is a plan view of the second holder and the second slider (coupled with each other) when viewed from below according to the third modification.

FIG. 17 is a perspective view of the exterior of a second holder 105 and a second slider 105A (not coupled with each other) when viewed from below according to a third modification. FIG. 18 is a perspective view of the exterior of the second holder 105 and the second slider 105A (coupled with each other) when viewed from below according to the third modification. FIG. 19 is a plan view of the second holder 105 and the second slider 105A (coupled with each other) when viewed from below according to the third modification.

As illustrated in FIG. 17 through FIG. 19, each of a fitting protrusion 105C and a fitting hole 105Ac according to the third modification has a circular shape in a plan view. As illustrated in FIG. 17 through FIG. 19, the fitting protrusion 105C according to the third modification is provided with a plurality of protrusions 105Ca that protrude outward from the outer peripheral edge of the circular-shaped fitting protrusion 105C. In the example illustrated in FIG. 17 through FIG. 19, the fitting protrusion 105C is provided with four protrusions 105Ca arranged at 90-degree intervals. Therefore, the fitting protrusion 105C is slightly larger than the fitting hole 105Ac, and thus, the fitting protrusion 105C can be pressed and fixed into the fitting hole 105Ac.

As illustrated in FIG. 17 through FIG. 19, a thick portion 105Ad having an increased thickness is formed over the entire inner peripheral edge of the fitting hole 105Ac according to the third modification (that is, the thick portion 105Ad has a circular shape in a plan view). Accordingly, while the thickness of the entire second slider 105A according to third modification is small, the strength of the inner peripheral edge of the fitting hole 105Ac is increased and the fitting hole 105Ac is not readily deformed. Therefore, the fitting protrusion 105C can be easily pressed into the fitting hole 105Ac.

As illustrated in FIG. 17 through FIG. 19, a plurality of recesses 105Ae that are recessed downward from upper edge portions of the thick portion 105Ad are formed in the thick portion 105Ad according to the third modification. In the third modification, the thick portion 105Ad has four recesses 105Ae that are arranged at 90-degree intervals at positions corresponding to the four protrusions 105Ca of the fitting protrusion 105C, which are arranged at 90-degree intervals.

In the third modification, after the fitting protrusion 105C is pressed into the fitting hole 105Ac, the fitting protrusion 105C is swaged. As a result, the four protrusions 105Ca can be fitted into the respective recesses 105Ae as illustrated in FIG. 18 and FIG. 19. Accordingly, in the third modification, falling off, looseness, and rotation of the second slider 105A with respect to the second holder 105 do not readily occur.

<Fourth Modification>

FIG. 20 is an enlarged perspective view of the exterior of a second holder 105 and a second slider 105A (before swaging) according to a fourth modification. FIG. 21 is an enlarged perspective view of the exterior of the second holder 105 and the second slider 105A (after swaging) according to the fourth modification.

In the second holder 105 and the second slider 105A according to the fourth modification, after a fitting protrusion 105C is fitted into a fitting hole 105Ac as illustrated in FIG. 20, the fitting protrusion 105C may be swaged by applying heat to the fitting protrusion 105C as illustrated in FIG. 21. Accordingly, the top surface of the fitting protrusion 105C can be deformed into a flat shape so as to cover the entire thick portion 105Ad, thereby allowing the second slider 105A to be securely fixed to the second holder 105.

In each of the first modification to the fourth modification, the method for fixing the second slider 105A to the second holder 105 has been described. However, the first slider 107A can also be fixed to the first holder 107 by using any of the above-described fixing methods.

Although specific embodiments have been described above, the claimed subject matter is not limited to the above-described embodiments. Variations and modifications may be made without departing from the scope of the present invention.

In the embodiments, one holding piece and the other holding piece of an engagement portion have different widths such that the one holding piece and the other holding piece have different elasticity; however, the present invention is not limited thereto. For example, the thicknesses, shapes, materials, or the like of the one holding piece and the other holding piece of the engagement portion may be different such that the one holding piece and the other holding piece have different elasticity.

For example, the distance (groove width) between the holding pieces of the engagement portion is not required to be constant in the upper-lower direction (the Z-axis direction). One of the holding pieces may have a tapered shape such that the distance (groove width) between the holding pieces gradually increases downward. Alternatively, each of the holding pieces may have a tapered shape such that the distance (groove width) between the holding pieces gradually decreases downward.

According to an embodiment, the accuracy of a value of an output signal indicating a neutral position when a lever returns to the neutral position can be improved.

What is claimed is:

1. An operation device comprising:
a lever configured to be tiltable;
a substrate having a surface;
a first actuator configured to rotate in accordance with tilting of the lever; and
a first holder configured to move in a first direction via a first drive transmission part in accordance with rotation of the first actuator,
wherein the first drive transmission part includes
a first protrusion having a cylindrical shape, integrated with the first holder, and protruding in a second direction that is orthogonal to the first direction, and a first engagement portion integrated with the first actuator and including a pair of holding pieces configured to hold the first protrusion from both sides in the first direction, and wherein a first holding piece of the pair of holding pieces of the first engagement portion is more elastic than a second holding piece of the pair of holding pieces.

2. The operation device according to claim 1, wherein, in a state in which the first protrusion is not held by the pair of holding pieces, a distance between the first holding piece and the second holding piece is smaller than a diameter of the first protrusion, and the first holding piece is elastically deformed such that the first protrusion is held by the pair of holding pieces.

3. The operation device according to claim 2, wherein the first holding piece is elastically deformed and the second holding piece is not elastically deformed such that the first protrusion is held by the pair of holding pieces.

4. The operation device according to claim 3, wherein a width of the first holding piece in the first direction is smaller than a width of the second holding piece in the first direction such that the first holding piece is more elastic than the second holding piece.

5. The operation device according to claim 1, further comprising a second actuator configured to rotate in accordance with tilting of the lever, and a second holder configured to move in the second direction via a second drive transmission part in accordance with rotation of the second actuator, wherein the second drive transmission part includes a second protrusion having a cylindrical shape, integrated with the second holder, and protruding in the first direction, and a second engagement portion integrated with the second actuator and including an additional pair of holding pieces configured to hold the second protrusion from both sides in the second direction, and wherein a third holding piece of the additional pair of holding pieces of the second engagement portion is more elastic than a fourth holding piece of the additional pair of holding pieces.

* * * * *